US012720222B2

(12) United States Patent
Tamano et al.

(10) Patent No.: US 12,720,222 B2
(45) Date of Patent: Aug. 25, 2026

(54) SIGNAL PROCESSING DEVICE, IMAGING DEVICE, AND SIGNAL PROCESSING METHOD

(71) Applicant: Sony Semiconductor Solutions Corporation, Kanagawa (JP)

(72) Inventors: Yuki Tamano, Kanagawa (JP); Takashi Fujikawa, Kanagawa (JP); Kosuke Iwao, Tokyo (JP); Yohei Kato, Kanagawa (JP); Yasushi Yamazaki, Tokyo (JP); Yasutaka Kimura, Kanagawa (JP); Takahiro Miyazaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 49 days.

(21) Appl. No.: 18/846,178

(22) PCT Filed: Mar. 7, 2023

(86) PCT No.: PCT/JP2023/008539

§ 371 (c)(1), (2) Date: Sep. 11, 2024

(87) PCT Pub. No.: WO2023/189279

PCT Pub. Date: Oct. 5, 2023

(65) Prior Publication Data

US 2025/0184630 A1 Jun. 5, 2025

(30) Foreign Application Priority Data

Mar. 29, 2022 (JP) ................................ 2022-054433

(51) Int. Cl.
*H04N 25/47* (2023.01)
*H04N 25/60* (2023.01)
(Continued)

(52) U.S. Cl.
CPC ............ *H04N 25/47* (2023.01); *H04N 25/65* (2023.01)

(58) Field of Classification Search
CPC ........ H04N 25/47; H04N 25/65; H04N 25/60; H04N 25/76; H04N 25/77
See application file for complete search history.

(56) References Cited

U.S. PATENT DOCUMENTS

2017/0033777 A1* 2/2017 Kim ...................... G01J 1/4204
2020/0312899 A1* 10/2020 Seo ........................ H04N 25/77
2020/0410272 A1* 12/2020 Seo ...................... G06V 10/147

FOREIGN PATENT DOCUMENTS

JP 2020161993 A 10/2020
WO 2021084833 A1 5/2021
(Continued)

OTHER PUBLICATIONS

International Search Report (PCT/ISA/210), International Application No. PCT/JP2023/008539, dated May 30, 2023.

*Primary Examiner* — Ahmed A Berhan
(74) *Attorney, Agent, or Firm* — Michael Best & Friedrich LLP

(57) ABSTRACT

A signal processing device according to one aspect of the present disclosure includes an acquisition unit, a counter, and a threshold changing unit. The acquisition unit acquires, of a plurality of electrical signals generated by a plurality of photoelectric conversion elements in response to incident light, a signal whose signal change amount exceeds a predetermined threshold as an event signal. The counter counts, of a plurality of event signals acquired by the acquisition unit, signals corresponding to noise. The threshold changing unit changes the threshold on the basis of the number of noise events obtained by the counter.

19 Claims, 20 Drawing Sheets

(51) Int. Cl.
*H04N 25/65* (2023.01)
*H04N 25/76* (2023.01)
*H04N 25/77* (2023.01)

(56) References Cited

FOREIGN PATENT DOCUMENTS

| | | | |
|---|---|---|---|
| WO | 2021235323 | A1 | 11/2021 |
| WO | 2021241120 | A1 | 12/2021 |

* cited by examiner

[ FIG. 1 ]
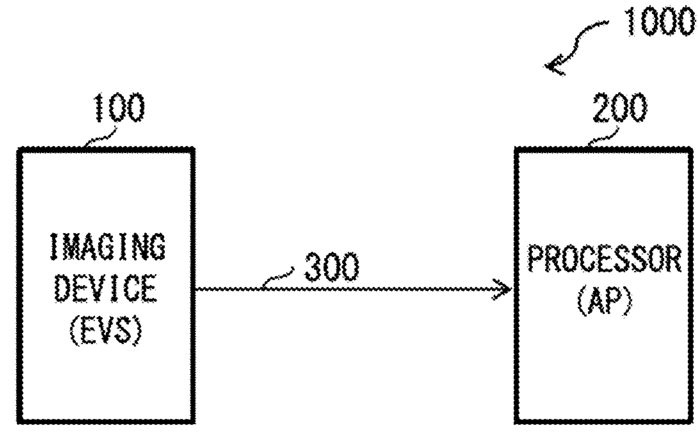
[ FIG. 2 ]
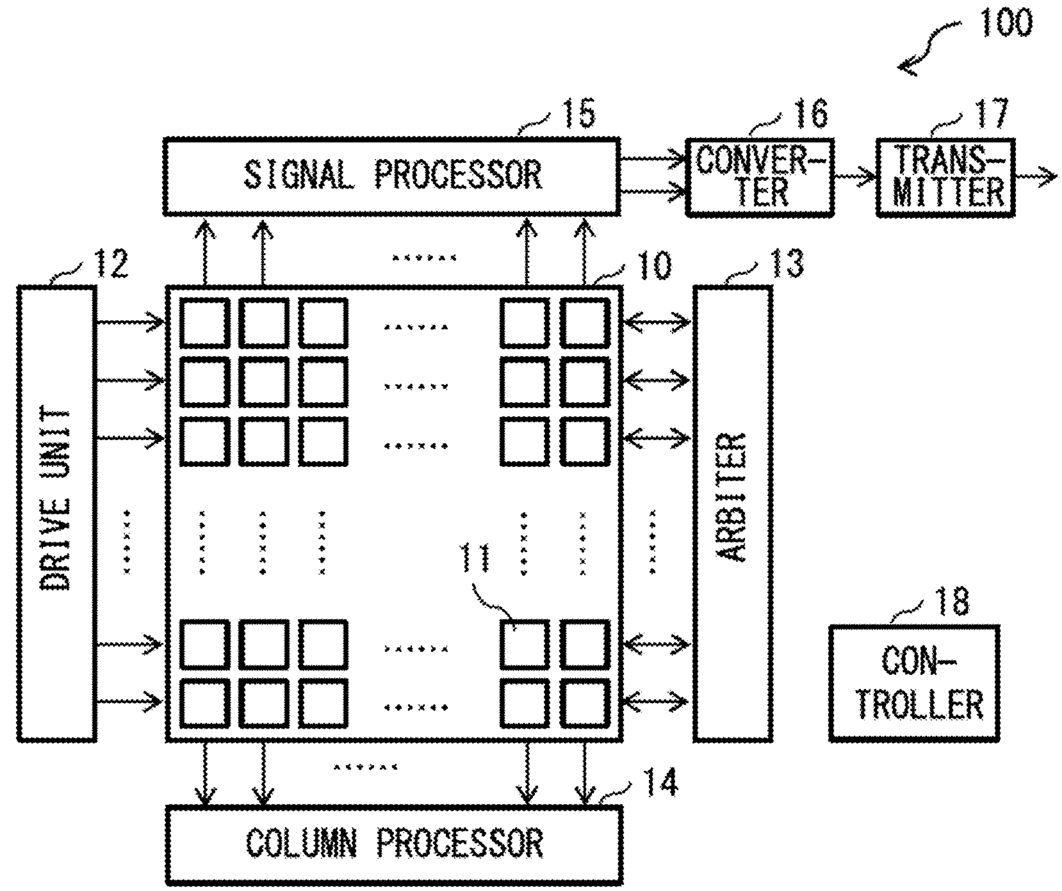

[ FIG. 3 ]
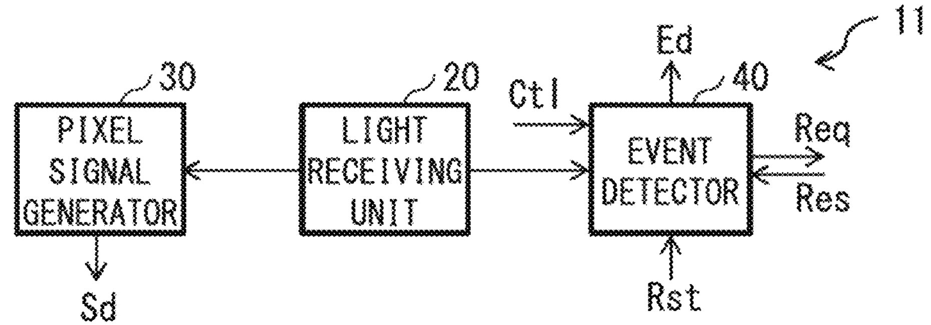
[ FIG. 4 ]
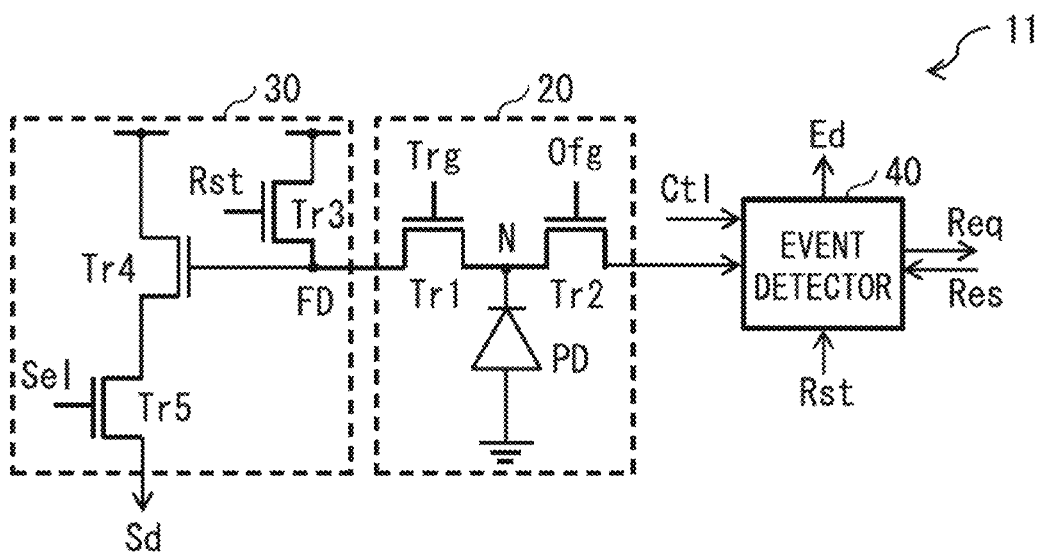

[ FIG. 5 ]
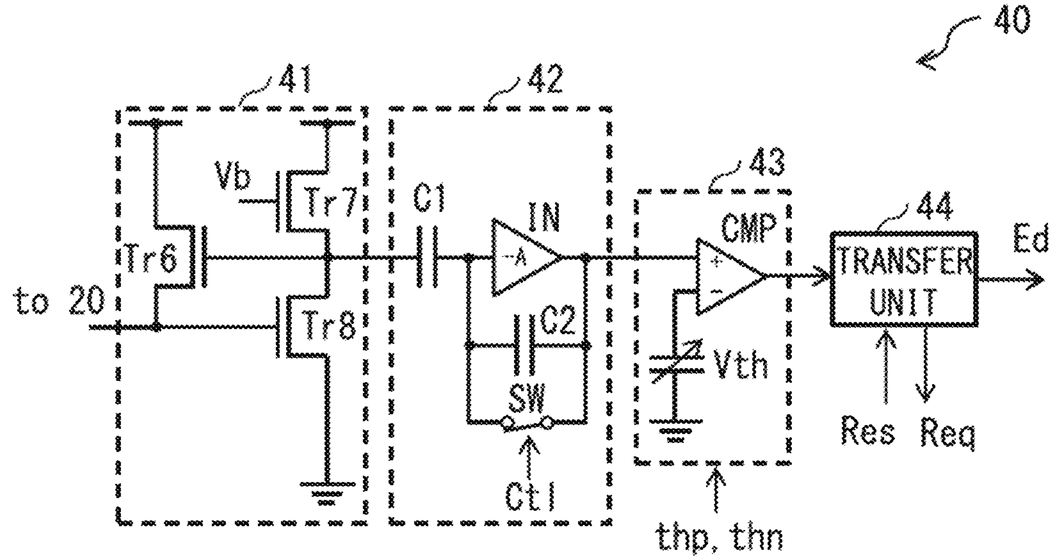
[ FIG. 6 ]
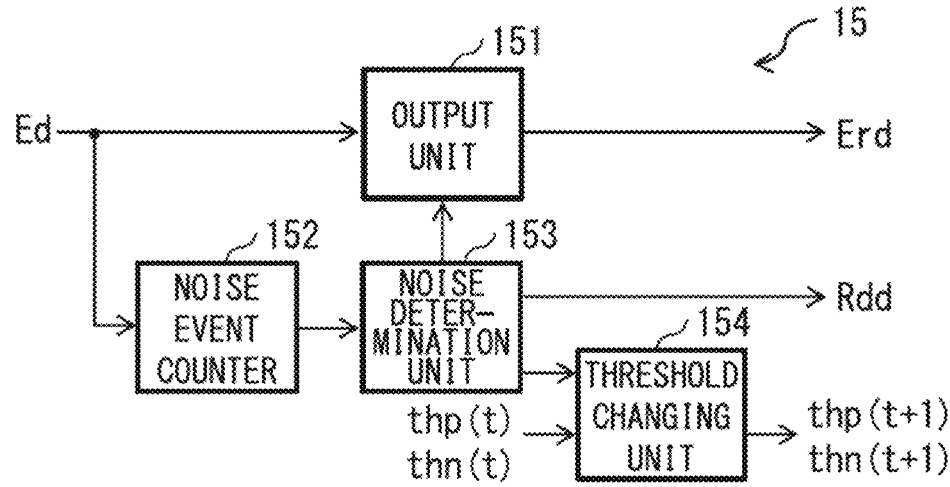

[ FIG. 7 ]
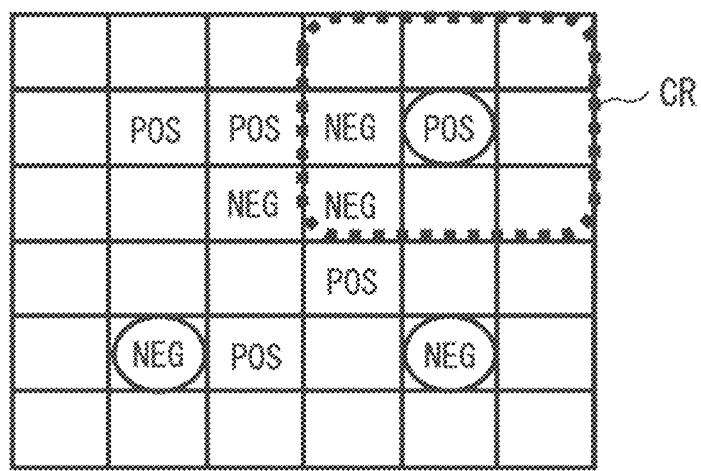
[ FIG. 8 ]
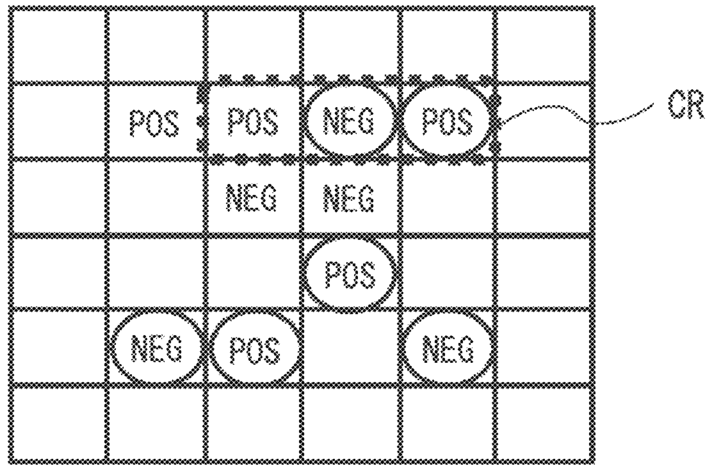

[ FIG. 9 ]
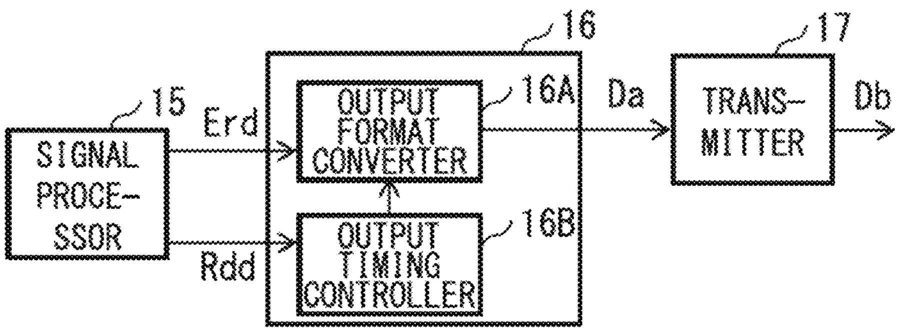

[ FIG. 10 ]
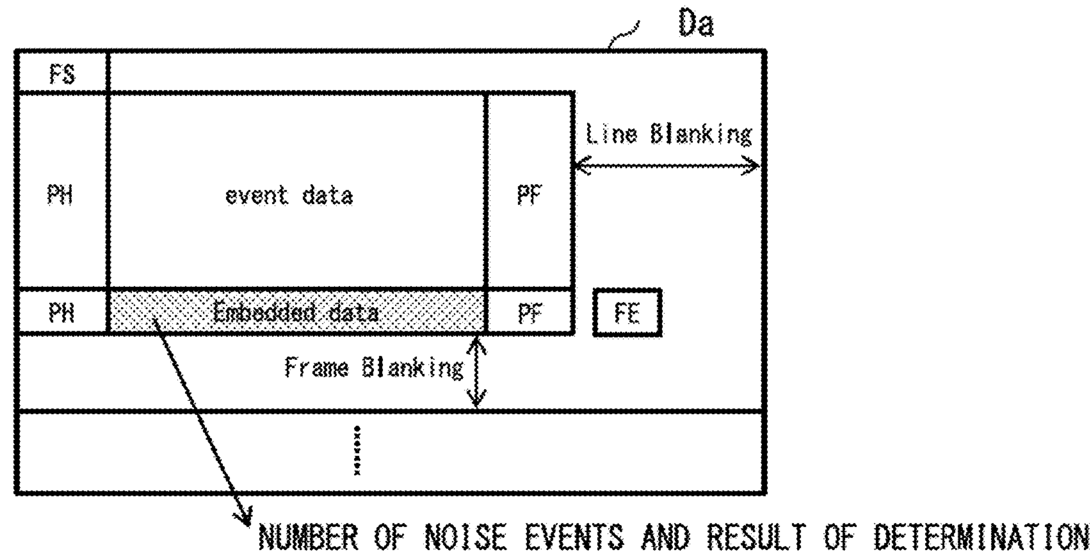
[ FIG. 11 ]
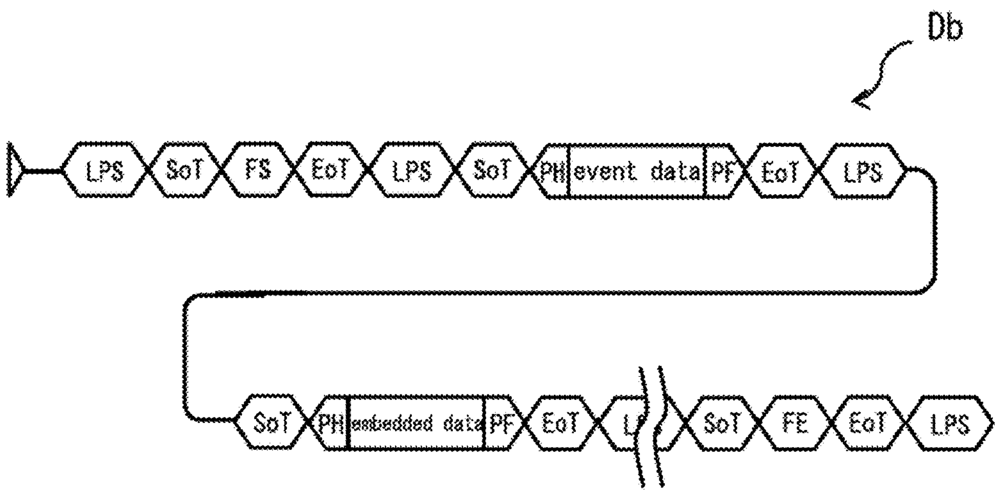

[ FIG. 12 ]
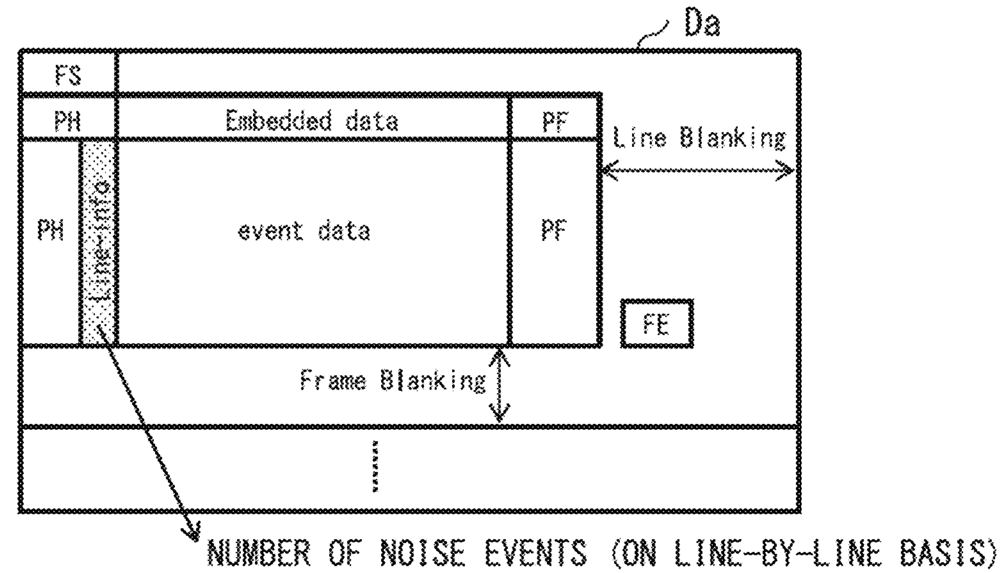
[ FIG. 13 ]
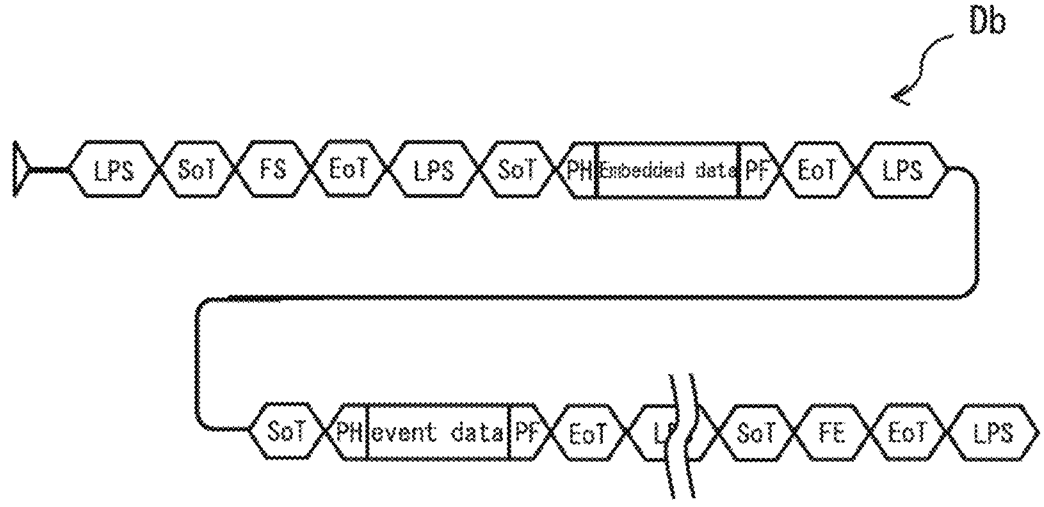

[ FIG. 14 ]
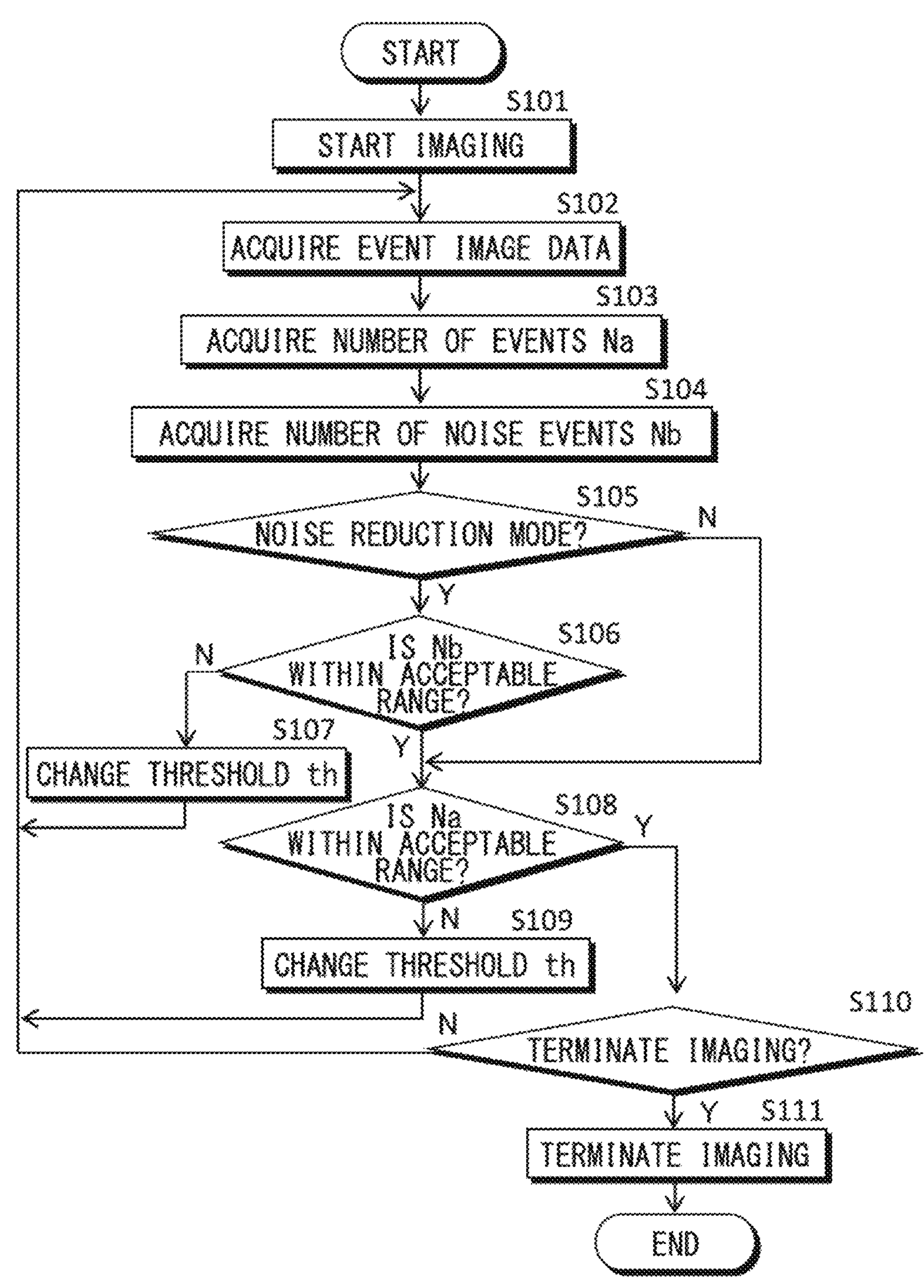

[ FIG. 15 ]
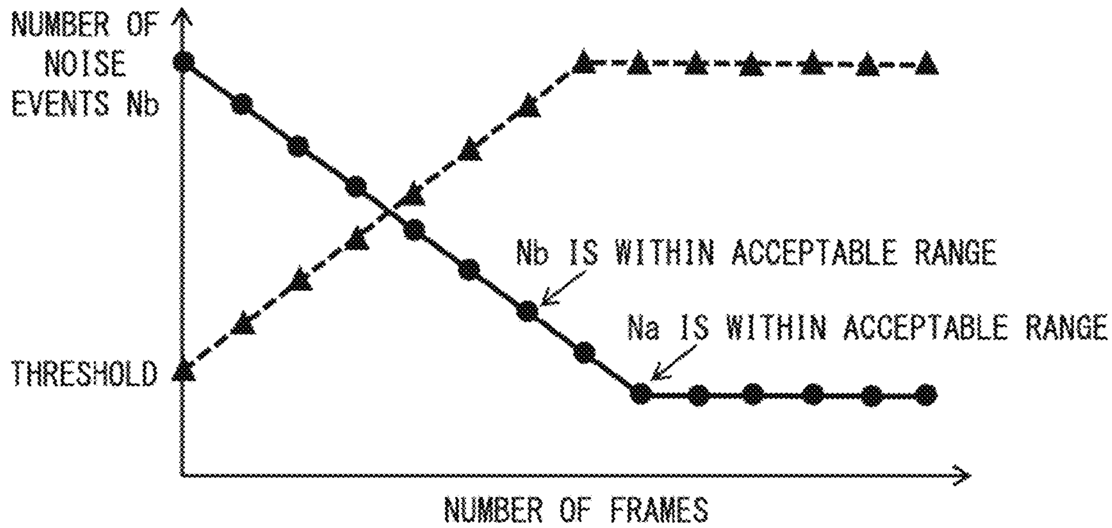
[ FIG. 16 ]
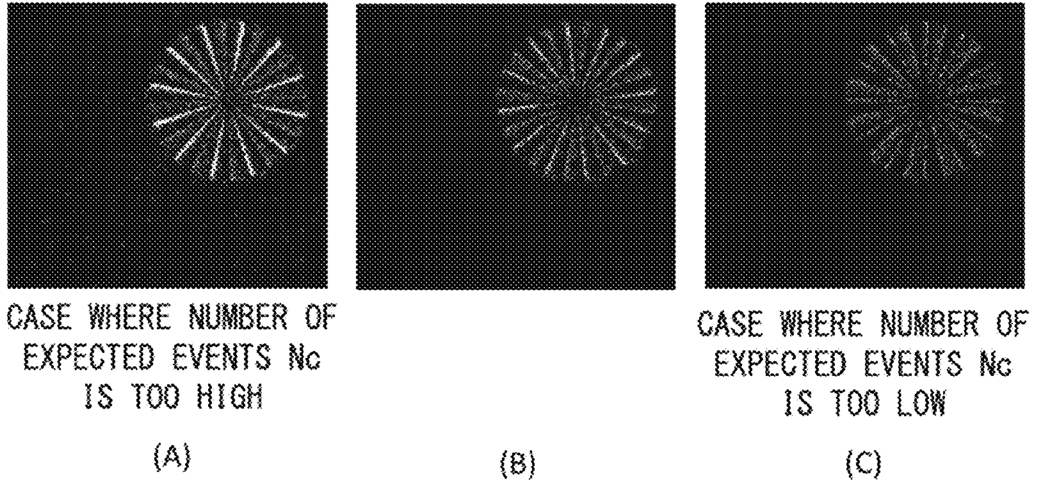

[ FIG. 17 ]
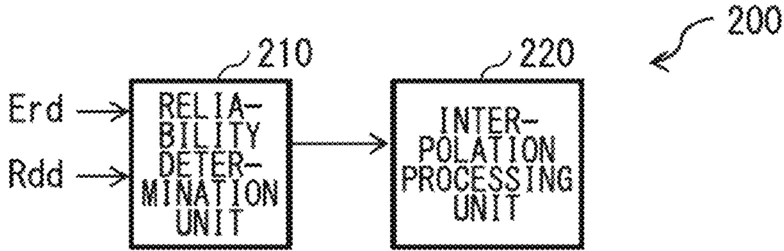
[ FIG. 18 ]
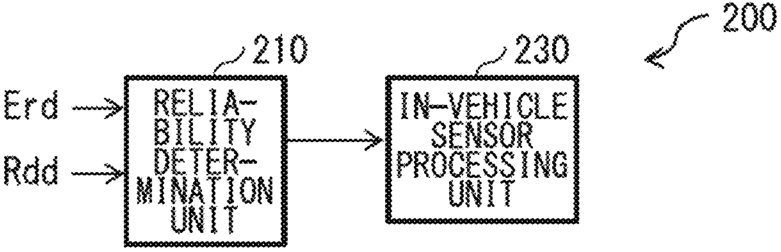
[ FIG. 19 ]
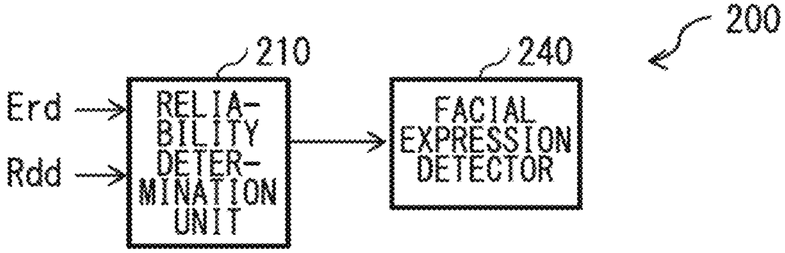

[ FIG. 20 ]
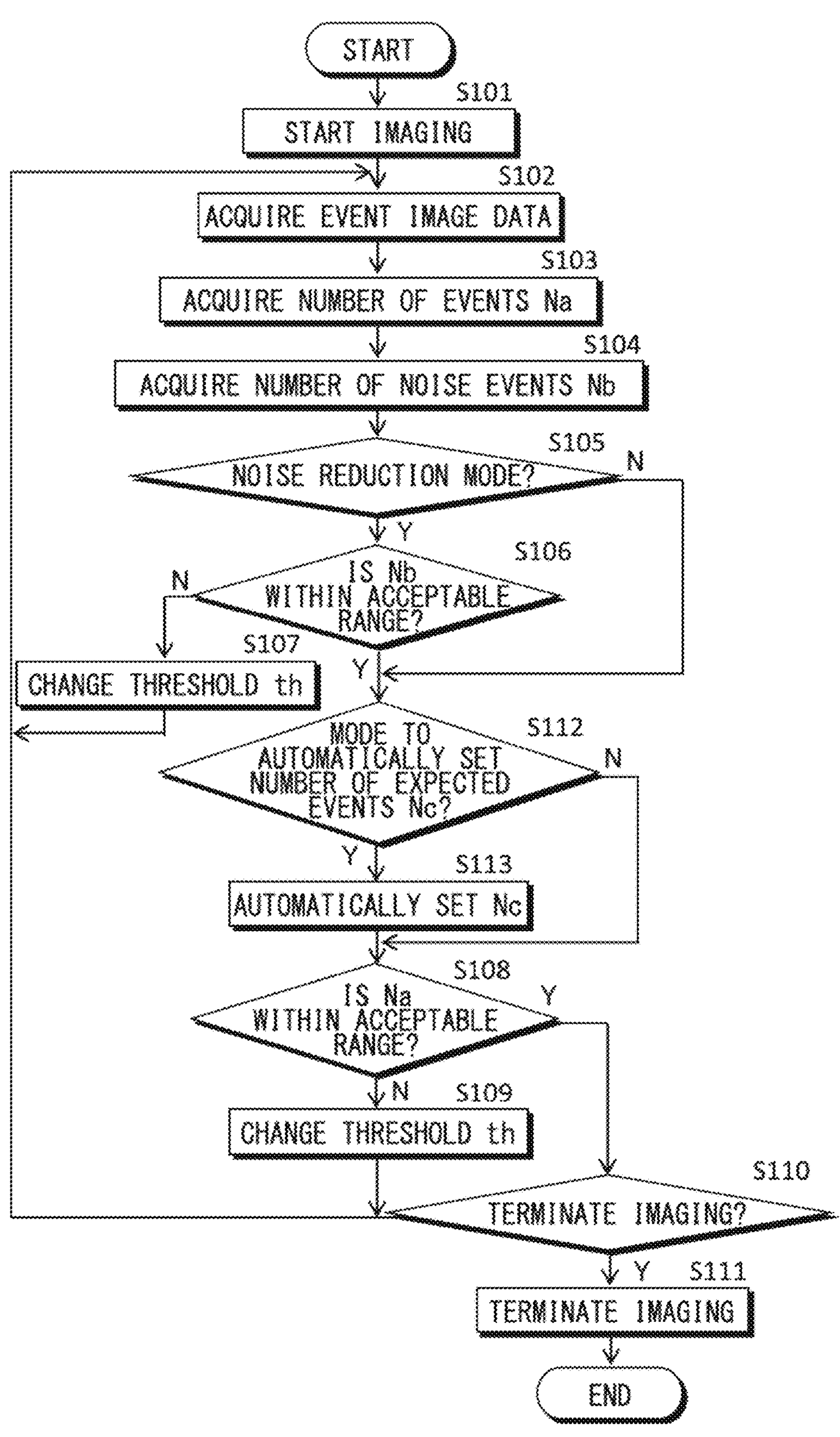

[ FIG. 21 ]
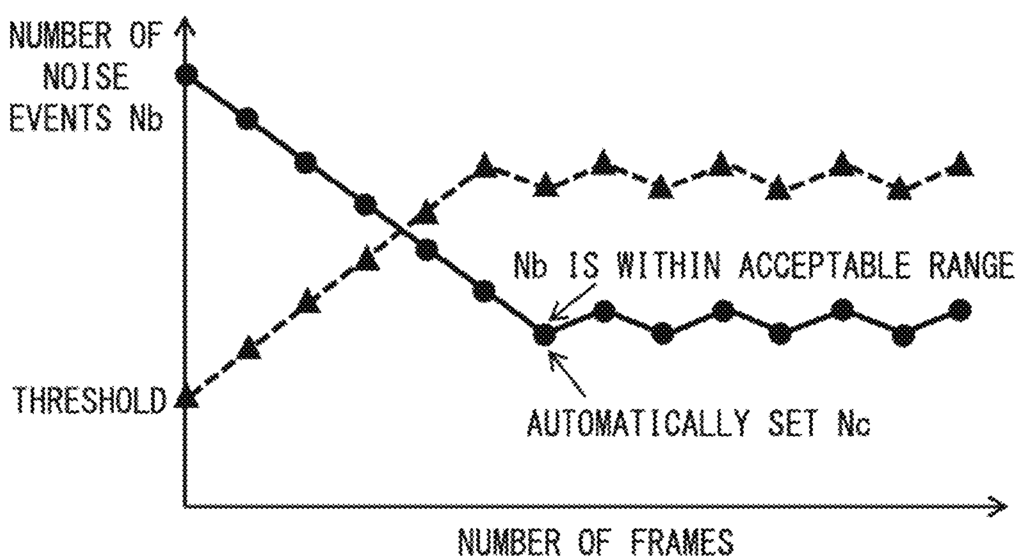

[ FIG. 22 ]
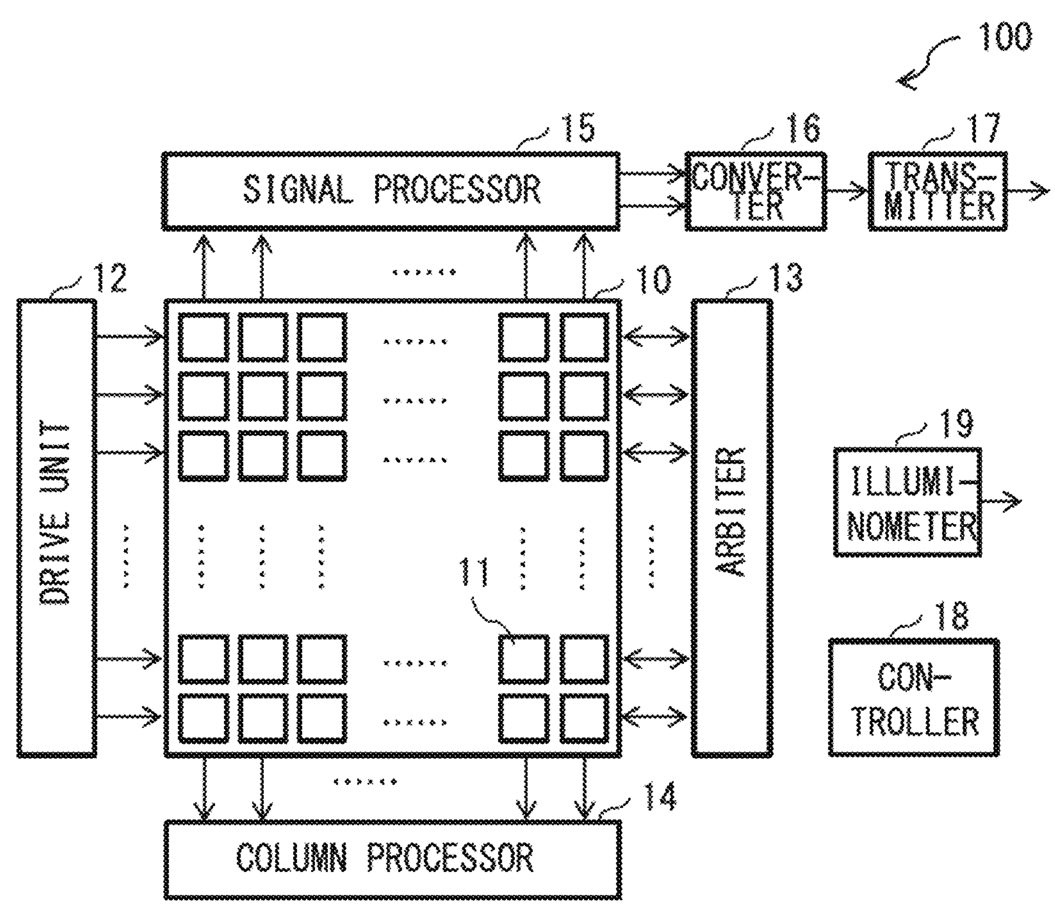

[ FIG. 23 ]
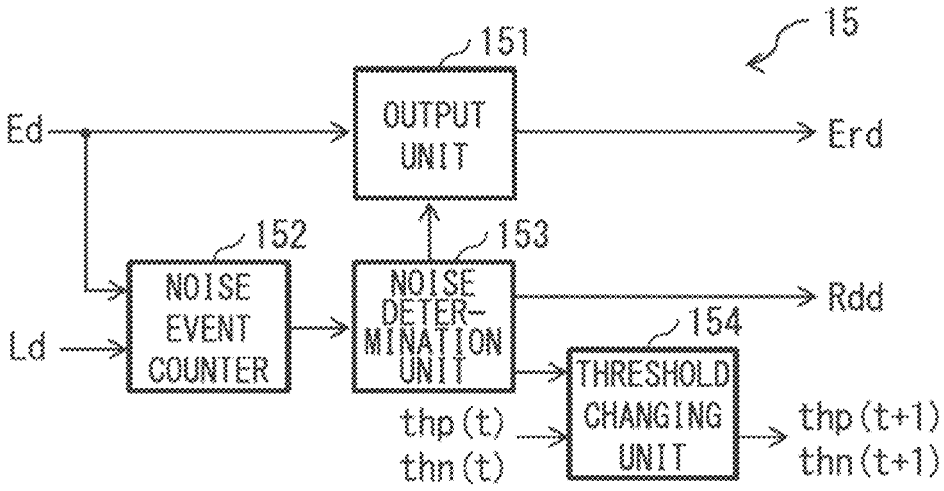
[ FIG. 24 ]
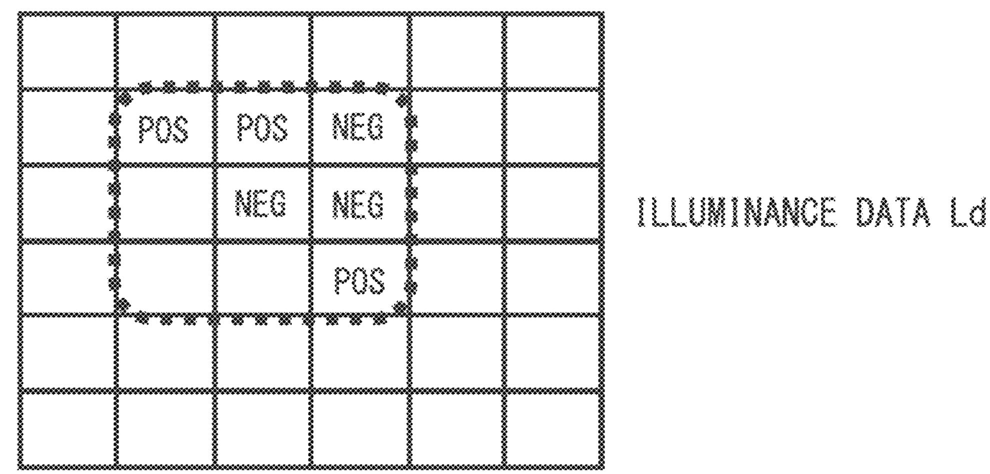

[ FIG. 25 ]
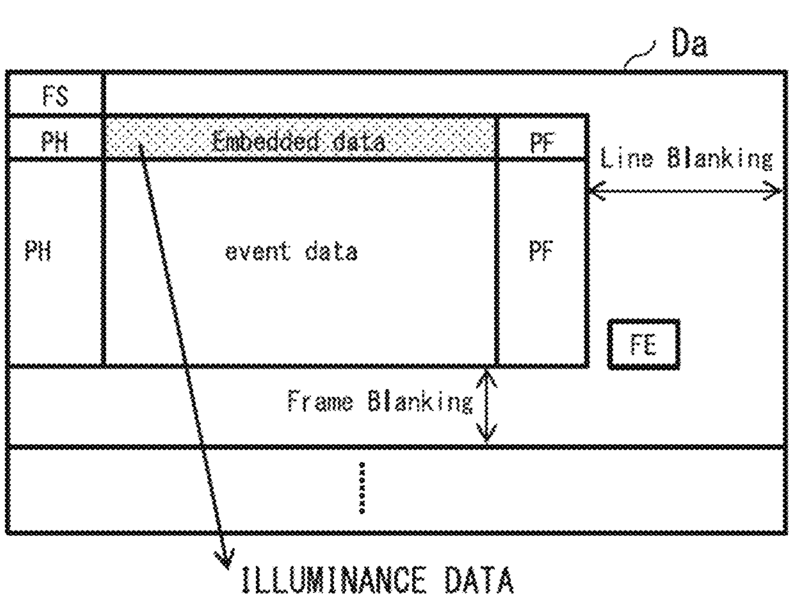

[ FIG. 26 ]
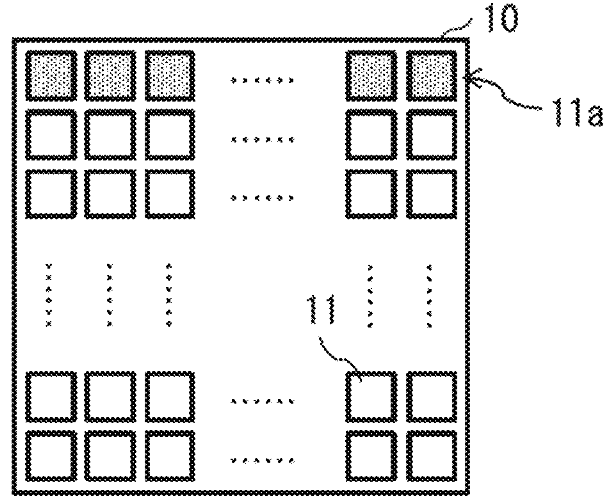
[ FIG. 27 ]
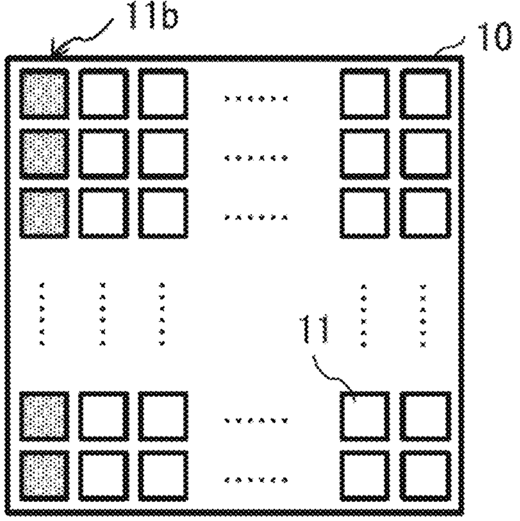

[ FIG. 28 ]
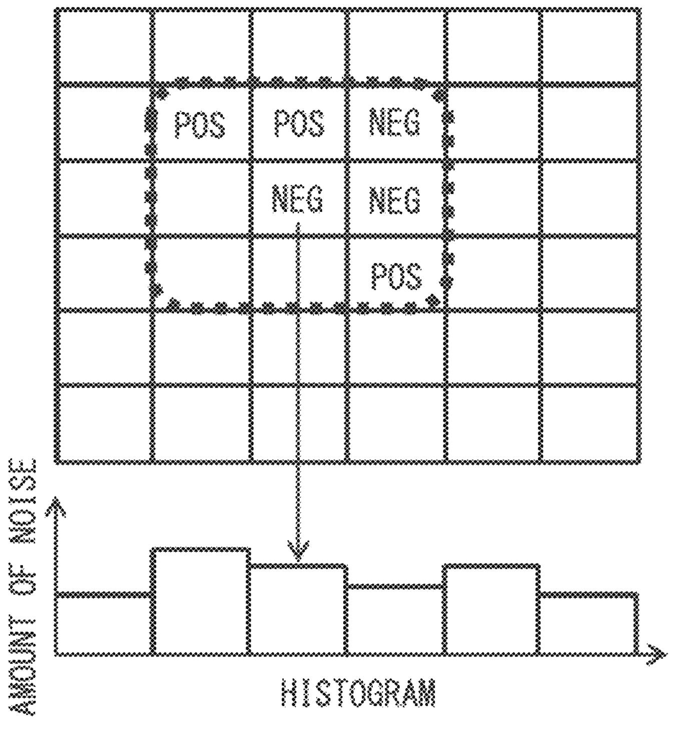

[ FIG. 29 ]
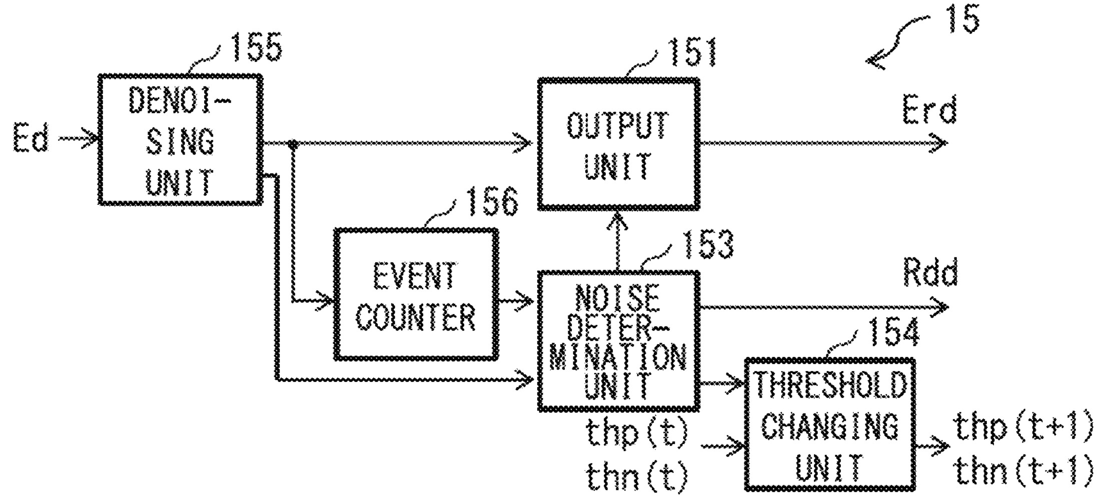

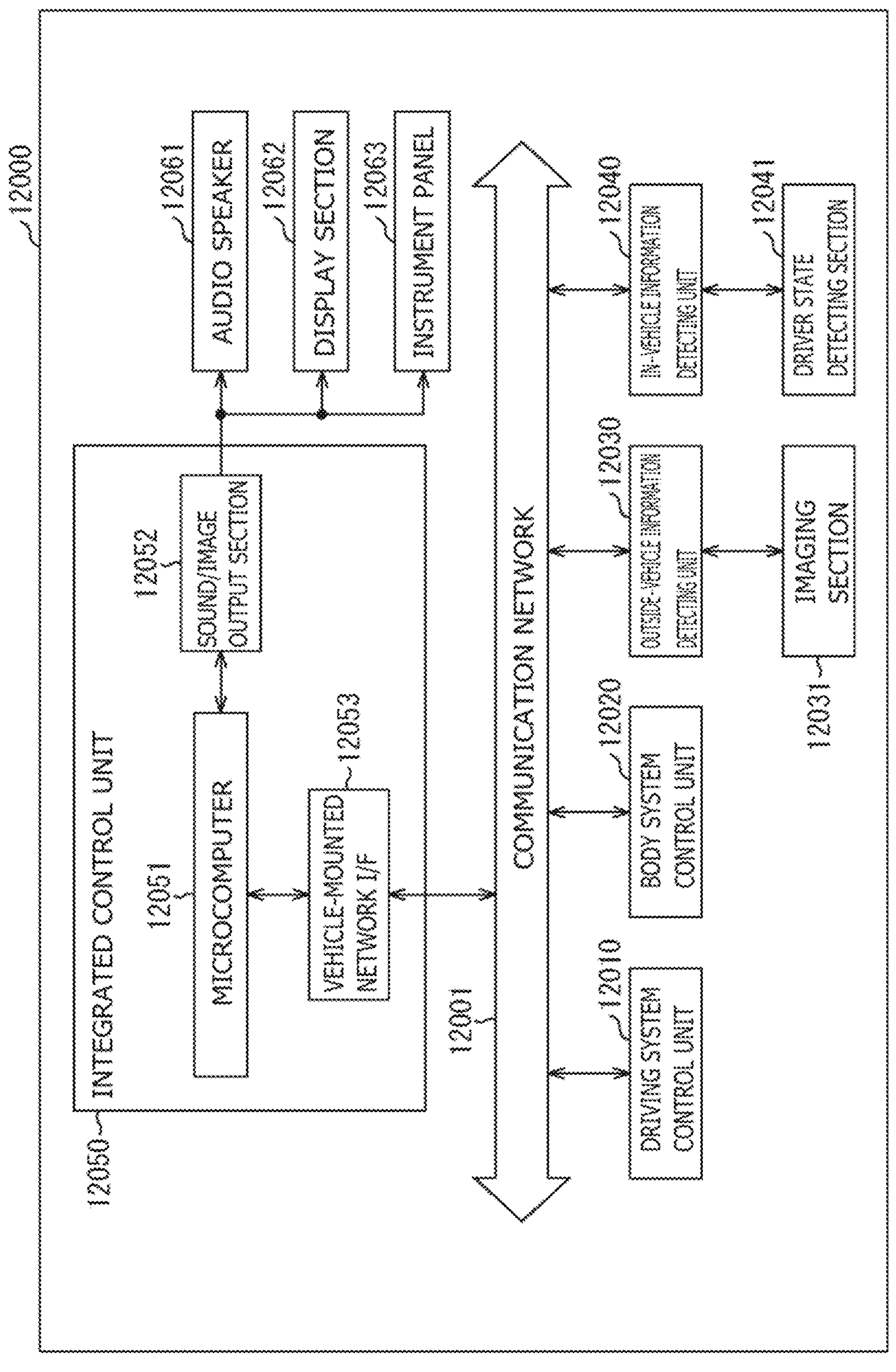
FIG. 30
12000
12050
INTEGRATED CONTROL UNIT
12051
MICROCOMPUTER
12052
SOUND/IMAGE OUTPUT SECTION
12053
VEHICLE-MOUNTED NETWORK I/F
12061
AUDIO SPEAKER
12062
DISPLAY SECTION
12063
INSTRUMENT PANEL
12001
COMMUNICATION NETWORK
12010
DRIVING SYSTEM CONTROL UNIT
12020
BODY SYSTEM CONTROL UNIT
12030
OUTSIDE-VEHICLE INFORMATION DETECTING UNIT
12031
IMAGING SECTION
12040
IN-VEHICLE INFORMATION DETECTING UNIT
12041
DRIVER STATE DETECTING SECTION

[ FIG. 31 ]
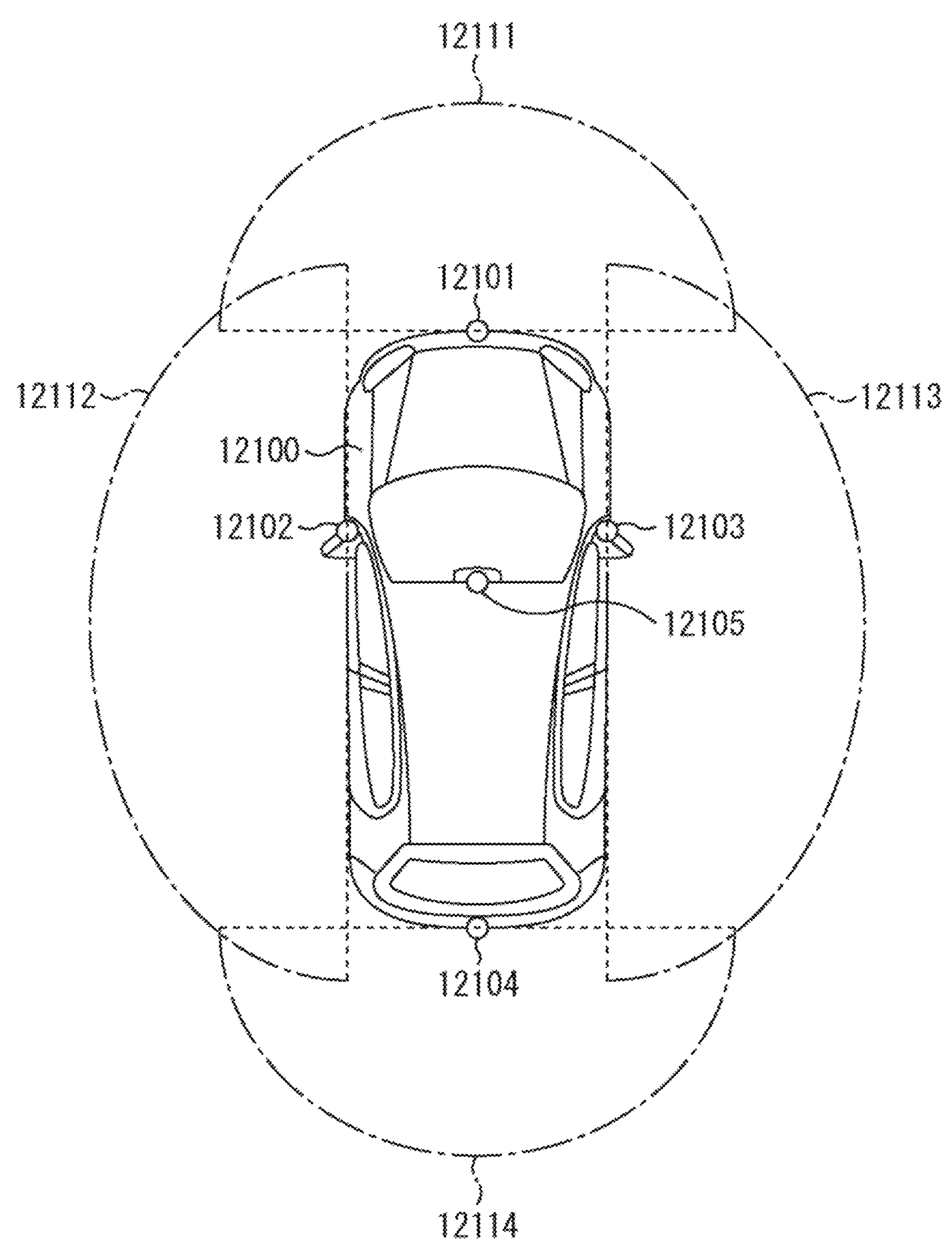

SIGNAL PROCESSING DEVICE, IMAGING DEVICE, AND SIGNAL PROCESSING METHOD

TECHNICAL FIELD

The present disclosure relates to a signal processing device, an imaging device, and a signal processing method.

BACKGROUND ART

There is known an imaging device that acquires, only when some kind of event has occurred in an imaging scene, data of a part where the event has caused a change in the brightness level. This type of imaging device may be called an event base vision sensor (EVS).

An existing EVS basically has a fixed threshold for event detection, and therefore is disadvantageous in that the robustness with respect to an imaging scene is low. To cope with such an issue, for example, the inventions according to PTLs 1 and 2 propose to automatically set a threshold for event detection.

CITATION LIST

Patent Literatures

PTL 1: International Publication No. WO2021/235323

PTL 2: Japanese Unexamined Patent Application Publication No. 2020-161993

SUMMARY OF INVENTION

However, the number of expected events changes depending on an imaging scene; therefore, there is an issue that it is difficult to set the number of expected events for automatically setting the threshold for event detection. Accordingly, it is desirable to provide a signal processing device, an imaging device, and a signal processing method that make it possible to perform automatic setting of the threshold for event detection more properly.

A signal processing device according to one aspect of the present disclosure includes an acquisition unit, a counter, and a threshold changing unit. The acquisition unit acquires, of a plurality of electrical signals generated by a plurality of photoelectric conversion elements in response to incident light, a signal whose signal change amount exceeds a predetermined threshold as an event signal. The counter counts, of a plurality of the event signals acquired by the acquisition unit, signals corresponding to noise. The threshold changing unit changes the threshold on the basis of the number of noise events obtained by the counter.

An imaging device according to one aspect of the present disclosure includes a plurality of photoelectric conversion elements that photoelectrically converts incident light and generates electrical signals. This imaging device further includes a plurality of signal output units provided for the respective photoelectric conversion elements, a counter, and a threshold changing unit. Each signal output unit outputs an event signal in a case where an amount of change in the electrical signal generated by its corresponding photoelectric conversion element exceeds a predetermined threshold. The counter counts, of a plurality of the event signals output from the plurality of signal output units, signals corresponding to noise. The threshold changing unit changes the threshold on the basis of the number of noise events obtained by the counter.

A signal processing method according to one aspect of the present disclosure includes the following three steps:

(A) acquiring, of a plurality of electrical signals generated by a plurality of photoelectric conversion elements in response to incident light, a signal whose signal change amount exceeds a predetermined threshold as an event signal;

(B) counting, of a plurality of the event signals acquired, signals corresponding to noise; and (C) changing the threshold on the basis of the number of noise events obtained.

In the signal processing device and the signal processing method according to one aspect of the present disclosure, of a plurality of electrical signals generated by the plurality of photoelectric conversion elements in response to the incident light, a signal whose signal change amount exceeds the predetermined threshold is acquired as an event signal. Of a plurality of event signals acquired, signals corresponding to noise are counted, and the threshold is changed on the basis of the number of noise events obtained by doing that. Thus, for example, in a case where the sensitivity to an imaging scene is too high, the number of noise events increases; therefore, it is possible to change the threshold to cause the number of noise events to be small. Furthermore, for example, it is also possible to change the threshold to cause the number of noise events to be close to an acceptable range.

In the imaging device according to one aspect of the present disclosure, in a case where an amount of change in the electrical signal generated by the photoelectric conversion element in response to the incident light exceeds the predetermined threshold, an event signal is output from each signal output unit. Of a plurality of event signals output, signals corresponding to noise are counted, and the threshold is changed on the basis of the number of noise events obtained by doing that. Thus, for example, in a case where the sensitivity to an imaging scene is too high, the number of noise events increases; therefore, it is possible to change the threshold to cause the number of noise events to be small. Furthermore, for example, it is also possible to change the threshold to cause the number of noise events to be close to an acceptable range.

BRIEF DESCRIPTION OF DRAWINGS

FIG. 1 is a diagram illustrating a schematic configuration example of an information processing system.

FIG. 2 is a diagram illustrating a schematic configuration example of an imaging device in FIG. 1.

FIG. 3 is a diagram illustrating a schematic configuration example of each pixel in FIG. 2.

FIG. 4 is a diagram illustrating an example of a circuit configuration of each pixel in FIG. 2.

FIG. 5 is a diagram illustrating an example of a circuit configuration of a pixel signal generator in FIG. 3.

FIG. 6 is a diagram illustrating an example of a functional block of a signal processor in FIG. 2.

FIG. 7 is a diagram illustrating an example of how to identify a noise event.

FIG. 8 is a diagram illustrating an example of how to identify a noise event.

FIG. 9 is a diagram illustrating an example of a functional block of a converter in FIG. 2.

FIG. 10 is a diagram illustrating an example of output data from the converter in FIG. 9.

FIG. 11 is a diagram illustrating an example of output data from a transmitter in FIG. 9.

FIG. 12 is a diagram illustrating an example of output data from the converter in FIG. 9.

FIG. 13 is a diagram illustrating an example of output data from the transmitter in FIG. 9.

FIG. 14 is a diagram illustrating an example of a threshold changing procedure in the imaging device in FIG. 1.

FIG. 15 is a diagram illustrating an example of change in the number of noise events with change in a threshold.

FIG. 16 is a diagram illustrating an example of event image data in accordance with the number of expected events.

FIG. 17 is a diagram illustrating an example of a functional block of a processor.

FIG. 18 is a diagram illustrating an example of the functional block of the processor.

FIG. 19 is a diagram illustrating an example of the functional block of the processor.

FIG. 20 is a diagram illustrating a modification example of the threshold changing procedure in the imaging device in FIG. 1.

FIG. 21 is a diagram illustrating an example of change in the number of noise events with change in the threshold.

FIG. 22 is a diagram illustrating a modification example of the schematic configuration example of the imaging device in FIG. 1.

FIG. 23 is a diagram illustrating a modification example of the functional block of the signal processor in FIG. 2.

FIG. 24 is a diagram illustrating an example of how to identify a noise event.

FIG. 25 is a diagram illustrating an example of output data from the converter in FIG. 9.

FIG. 26 is a diagram illustrating a modification example of a pixel array section in FIG. 2.

FIG. 27 is a diagram illustrating a modification example of the pixel array section in FIG. 2.

FIG. 28 is a diagram illustrating an example of how to identify a noise event.

FIG. 29 is a diagram illustrating a modification example of the functional block of the signal processor in FIG. 2.

FIG. 30 is a block diagram depicting an example of schematic configuration of a vehicle control system.

FIG. 31 is a diagram of assistance in explaining an example of installation positions of an outside-vehicle information detecting section and an imaging section.

MODES FOR CARRYING OUT THE INVENTION

With reference to the drawings, an embodiment of the present disclosure will be described in detail below. The following description is a specific example of the present disclosure, and the present disclosure is not limited to the following modes.

1. Embodiment

FIG. 1 illustrates a schematic configuration example of an information processing system 1000 according to one embodiment of the present disclosure. The information processing system 1000 is a system applicable to a system equipped with a camera device. For example, the information processing system 1000 is applicable to an in-vehicle camera, a monitoring camera, industrial equipment (for example, equipment with a function of fault detection by a camera), robotics (for example, a drone equipped with a camera), a mobile device (for example, a smartphone equipped with a camera), etc. The information processing system 1000 includes an imaging device 100, a processor 200, and a bus 300 that couples these. The bus 300 may be installed between devices or inside a device in the information processing system 1000. The type of transfer data in the bus 300 is, for example, mipi CSI-2 data or mipi CSI-3 data.

FIG. 2 illustrates a schematic configuration example of the imaging device 100. The imaging device 100 is an asynchronous imaging device called an EVS. For example, as illustrated in FIG. 2, the imaging device 100 includes a pixel array section 10 including a plurality of pixels 11, a drive unit 12, an arbiter 13, a column processor 14, a signal processor 15, a converter 16, a transmitter 17, and a controller 18.

In the pixel array section 10, the plurality of pixels 11 is two-dimensionally arranged in a matrix. With respect to this array of pixels in a matrix, vertical signal lines to be described later are provided, two for each pixel column. Each pixel 11 generates a photocurrent in response to incident light, and generates, as a pixel signal, an analog signal (an electrical signal) of a voltage according to the generated photocurrent. Each pixel 11 detects the presence or absence of an address event by whether or not an amount of change in the pixel signal exceeds a predetermined threshold. A pixel 11 in which an address event has occurred outputs a request to the arbiter 13.

The drive unit 12 drives a plurality of pixels 11 and causes them to output a pixel signal generated by each of the pixels 11 to the column processor 14 through one of the vertical signal lines. The arbiter 13 arbitrates requests from the plurality of pixels 11, and transmits a response based on a result of the arbitration to each of the pixels 11. The pixel 11 having received the response from the arbiter 13 outputs a detection signal (an event signal) indicating a detection result to the drive unit 12 and the signal processor 15 through the other vertical signal line. As for readout of the event signal from the pixel 11, it is also possible to make it readout from pixels 11 in a plurality of rows.

The column processor 14 includes, for example, an analog-digital converter. For example, with respect to each pixel column of the pixel array section 10, the column processor 14 performs a process of converting analog pixel signals output from pixels 11 in that column into digital signals. And, the column processor 14 outputs the digital signals (the digital pixel signals) after the analog-digital conversion to the signal processor 15.

The signal processor 15 counts, of a plurality of event signals acquired from pixels 11, signals corresponding to noise, and, on the basis of the number of noise events obtained by doing that, changes a threshold for detecting the presence or absence of an address event. The signal processor 15 changes the threshold to cause the number of noise events to be close to an acceptable range. The signal processor 15 outputs, as event image data, the plurality of event signals acquired from the pixels 11 to the converter 16. The signal processor 15 further outputs reliability determination data to the converter 16. The reliability determination data includes, for example, reliability determination data such as the number of noise events, a result of determination of whether or not the number of noise events is within the acceptable range, and the threshold. The signal processor 15 further outputs, as image data, a plurality of pixel signals acquired from the column processor 14 to the converter 16.

The converter 16 converts various data obtained from the signal processor 15 into a format of transfer data in the bus 300. The converter 16 outputs the data after the conversion to the transmitter 17. The transmitter 17 transmits the data obtained from the converter 16 to the processor 200 via the bus 300. The controller 18 controls, for example, the operation of the pixel array section 10, the drive unit 12, the arbiter 13, the column processor 14, the signal processor 15, the converter 16, and the transmitter 17.

Subsequently, a configuration of each pixel 11 is described. FIG. 3 illustrates a schematic configuration example of each pixel 11. For example, as illustrated in FIG. 3, each pixel 11 includes a light receiving unit 20, a pixel signal generator 30, and an event detector 40.

The light receiving unit 20 photoelectrically converts incident light and generates a photocurrent. And, in accordance with control by the drive unit 12, the light receiving unit 20 outputs the photocurrent generated by the photoelectric conversion to either the pixel signal generator 30 or the event detector 40. The pixel signal generator 30 generates, as a pixel signal Sd, a signal of a voltage according to the photocurrent input from the light receiving unit 20, and outputs this generated pixel signal Sd to the column processor 14 through the vertical signal line.

The event detector 40 generates, as a pixel signal, an analog signal (an electrical signal) of a voltage according to the photocurrent from the light receiving unit 20. The event detector 40 detects the presence or absence of an address event by whether or not an amount of change in the generated pixel signal exceeds a predetermined threshold. The address event includes, for example, an ON event indicating that an amount of change in a pixel signal exceeds an upper limit threshold and an OFF event indicating that the change amount is below a lower limit threshold. Furthermore, an address-event detection signal includes, for example, 1 bit indicating a result of detection of an ON event and 1 bit indicating a result of detection of an OFF event. It is to be noted that the event detector 40 may be configured to detect only an ON event.

When an address event has occurred, the event detector 40 outputs a request to request for transmission of an address-event detection signal to the arbiter 13. And, when having received a response to the request from the arbiter 13, the event detector 40 outputs an address-event detection signal (an event signal Ed) to the drive unit 12 and the signal processor 15.

FIG. 4 illustrates an example of a circuit configuration of a pixel 11. As described above, each pixel 11 includes, for example, as illustrated in FIG. 4, the light receiving unit 20, the pixel signal generator 30, and the event detector 40.

The light receiving unit 20 includes a light receiving element (a photoelectric conversion element) PD, a transfer transistor Tr1, and an overflow gate (OFG) transistor Tr2. The transfer transistor Tr1 and the OFG transistor Tr2 are, for example, an N-type metal-oxide semiconductor (MOS) transistor. The transfer transistor Tr1 and the OFG transistor Tr2 are coupled to each other in series.

The light receiving element PD is coupled to between a common connection node N of the transfer transistor Tr1 and the OFG transistor Tr2 and the ground, and photoelectrically converts incident light and generates an amount of electric charge according to an amount of the incident light. A gate electrode of the transfer transistor Tr1 is supplied with a transfer signal Trg from the drive unit 12. In response to the transfer signal Trg, the transfer transistor Tr1 outputs the electric charge into which the incident light has been photoelectrically converted by the light receiving element PD to the pixel signal generator 30. A gate electrode of the OFG transistor Tr2 is supplied with a control signal Ofg from the drive unit 12. In response to the control signal Ofg, the OFG transistor Tr2 supplies an electrical signal generated by the light receiving element PD to the event detector 40. The electrical signal supplied to the event detector 40 is a photocurrent including an electric charge.

The pixel signal generator 30 includes, for example, a reset transistor Tr3, an amplifier transistor Tr4, a selection transistor Tr5, and a floating diffusion layer FD. The reset transistor Tr3, the amplifier transistor Tr4, and the selection transistor Tr5 are, for example, an N-type MOS transistor.

The electric charge into which the incident light has been photoelectrically converted by the light receiving element PD is supplied from the light receiving unit 20 to the pixel signal generator 30 by the transfer transistor Tr1. The electric charge supplied from the light receiving unit 20 is accumulated in the floating diffusion layer FD. The floating diffusion layer FD generates a voltage signal of a voltage value according to an amount of the accumulated electric charge. That is, the floating diffusion layer FD converts the electric charge into a voltage.

The reset transistor Tr3 is coupled to between a power supply line of power supply voltage and the floating diffusion layer FD. A gate electrode of the reset transistor Tr3 is supplied with a reset signal Rst from the drive unit 12. In response to the reset signal Rst, the reset transistor Tr3 initializes (resets) the amount of electric charge of the floating diffusion layer FD.

The amplifier transistor Tr4 and the selection transistor Tr5 are coupled to between a power supply line of power supply voltage and the vertical signal line. The amplifier transistor Tr4 and the selection transistor Tr5 are coupled to each other in series. The floating diffusion layer FD is coupled to a gate electrode of the amplifier transistor Tr4. The amplifier transistor Tr4 amplifies the voltage signal of the voltage into which the electric charge has been converted by the floating diffusion layer FD. A gate electrode of the selection transistor Tr5 is supplied with a selection signal Sel from the drive unit 12. In response to the selection signal Sel, the selection transistor Tr5 outputs, as a pixel signal Sd, the voltage signal amplified by the amplifier transistor Tr4 to the column processor 14 through the vertical signal line.

In the imaging device 100 provided with the plurality of pixels 11 having the above-described configuration, if the drive unit 12 is instructed to start detection of an address event by the controller 18, the drive unit 12 supplies a control signal Ofg to the OFG transistor Tr2 of the light receiving unit 20, thereby driving the OFG transistor Tr2 and causing it to supply a photocurrent to the event detector 40.

And, if an address event has been detected in a pixel 11, the drive unit 12 puts the OFG transistor Tr2 of that pixel 11 into an OFF state and causes it to stop the supply of a photocurrent to the event detector 40. Then, the drive unit 12 supplies a transfer signal Trg to the transfer transistor Tr1, thereby driving the transfer transistor Trg and causing it to transfer an electric charge into which incident light has been photoelectrically converted by the light receiving element PD to the floating diffusion layer FD.

In this way, the imaging device 100 provided with the plurality of pixels 11 having the above-described configuration outputs only a pixel signal Sd of a pixel 11 in which an address event has been detected to the column processor 14. Thus, as compared with a case of outputting pixel signals Sd of all pixels regardless of the presence or absence of an address event, it is possible to reduce the power consumption of the imaging device 100 and the amount of image processing.

It is to be noted that the configuration of the pixel 11 given here as an example is merely an example, and it is not limited to this configuration example. For example, each pixel 11 may have a pixel configuration in which it does not include the pixel signal generator 30. In this case, in the light receiving unit 20, the OFG transistor Tr2 may be eliminated, and the transfer transistor Tr1 may be provided with the function of the OFG transistor Tr2.

FIG. 5 illustrates an example of a circuit configuration of the event detector 40. For example, as illustrated in FIG. 5, the event detector 40 includes an IV converter 41, a subtracter 42, a quantizer 43, and a transfer unit 44.

The IV converter 41 converts a photocurrent from the light receiving unit 20 into a voltage signal of a logarithm of the photocurrent. The IV converter 41 supplies the converted voltage signal to the subtracter 42. For example, as illustrated in FIG. 5, the IV converter 41 includes an N-type transistor Tr6, a P-type transistor Tr7, and an N-type transistor Tr8. The N-type transistor Tr6, the P-type transistor Tr7, and the N-type transistor Tr8 are, for example, a MOS transistor.

The N-type transistor Tr6 is coupled to between a power supply line of power supply voltage and a signal input line. The P-type transistor Tr7 and the N-type transistor Tr8 are coupled to between a power supply line of power supply voltage and the ground. The P-type transistor Tr7 and the N-type transistor Tr& are coupled to each other in series. A gate electrode of the N-type transistor Tr6 and an input terminal of the subtracter 42 are coupled to a common connection node of the P-type transistor Tr7 and the N-type transistor Tr8.

A predetermined bias voltage Vb is applied to a gate electrode of the P-type transistor Tr7. Thus, the P-type transistor Tr7 supplies a constant current to the N-type transistor Tr8. The photocurrent from the light receiving unit 20 is input to a gate electrode of the N-type transistor Tr8 through the signal input line. Respective drain electrodes of the N-type transistors Tr6 and Tr8 are coupled to the power supply side; such a circuit is called a source follower. The photocurrent from the light receiving unit 20 is converted into a voltage signal of a logarithm of the photocurrent by these two source followers coupled in a loop.

The subtracter 42 decreases the level of the voltage signal supplied from the IV converter 41 in accordance with a row driving signal Ctl supplied from the drive unit 12. And, the subtracter 42 supplies the voltage signal after the level decrease to the quantizer 43. For example, as illustrated in FIG. 5, the subtracter 42 includes a capacitive element C1, an inverter circuit IN, a capacitive element C2, and a switch element SW.

One end of the capacitive element C1 is coupled to an output terminal of the IV converter 41, and the other end of the capacitive element C1 is coupled to an input terminal of the inverter circuit IN. The capacitive element C2 is coupled in parallel to the inverter circuit IN. The switch element SW is coupled to between both ends of the capacitive element C2. The switch element SW is supplied with, as its open-close control signal, a row driving signal Ctl from the drive unit 12. In accordance with the row driving signal Ctl, the switch element SW opens or closes a path connecting the both ends of the capacitive element C2. The inverter circuit IN reverses the polarity of a voltage signal input through the capacitive element C1.

In the subtracter 42 having the above-described configuration, when the switch element SW has been put into an ON (closed) state, a voltage signal Vinit is input to a terminal of the capacitive element C1 on the side of the IV converter 41, and its opposite-side terminal serves as a virtual ground terminal. A potential of this virtual ground terminal shall be zero for the sake of convenience. At this time, an electric charge Qinit accumulated in the capacitive element C1 is represented by the following Equation (1), where C1 denotes a capacitance value of the capacitive element C1.

$$Qinit = C1 \times Vinit \tag{1}$$

Next, assuming a case where the switch element SW has gone into an OFF (open) state, and the voltage of the terminal of the capacitive element C1 on the side of the IV converter 41 has changed to Vafter, an electric charge Qafter accumulated in the capacitive element C1 is represented by the following Equation (2).

$$Qafter - C1 \times Vafter \tag{2}$$

Meanwhile, an electric charge Q2 accumulated in the capacitive element C2 is represented by the following Equation (3), where C2 denotes a capacitance value of the capacitive element C2, and Vout denotes an output voltage.

$$Q2 = -C2 \times Vout \tag{3}$$

At this time, the total amount of electric charges of the capacitive elements C1 and C2 does not change; thus, the following Equation (4) holds true.

$$Qinit = Qafter + Q2 \tag{4}$$

If Equation (4) is modified by substituting Equations (1) to (3) into Equation (4), the following Equation (5) is obtained.

$$Vout = -(C1/C2) \times (Vafter - Vinit) \tag{5}$$

Equation (5) represents an operation of subtraction of a voltage signal, and a gain of a result of the subtraction is C1/C2. In general, it is desired to maximize the gain; therefore, it is preferable to design C1 to be large and C2 to be small. Meanwhile, if C2 is too small, kTC noise increases, and there is a possibility of deterioration in noise characteristics; therefore, reduction of the C2 capacity is limited to a range that allows noise to be accepted. Furthermore, the event detector 40 including the subtracter 42 is mounted on each pixel 11; thus, the capacitive elements C1 and C2 have a constraint on the area. Respective capacitance values of the capacitive elements C1 and C2 are determined in consideration of these.

The quantizer 43 quantizes the voltage signal supplied from the subtracter 42 into a digital signal, and outputs the digital signal as an address-event detection signal (an event signal) to the transfer unit 44. For example, as illustrated in FIG. 5, the quantizer 43 includes a comparator CMP. The comparator CMP sets an output signal from the inverter circuit IN, i.e., the voltage signal from the subtracter 42 as a non-inverting (+) input, and sets a predetermined threshold voltage Vth as an inverting (−) input. And, the comparator CMP compares the voltage signal from the subtracter 42 with the predetermined threshold voltage Vth, and outputs, as an address-event detection signal (an event signal), a signal indicating a result of the comparison to the transfer unit 44. The quantizer 43 sets (changes) an upper limit threshold voltage Vthp on the basis of a threshold setting signal thp from the controller 18. The quantizer 43 sets (changes) a lower limit threshold voltage Vthn on the basis of a threshold setting signal thn from the controller 18.

The transfer unit 44 outputs a request to request for transmission of an address-event detection signal to the arbiter 13. When having received a response to the request from the arbiter 13, the transfer unit 44 outputs the address-event detection signal (an event signal Ed) to the drive unit 12 and the signal processor 15.

FIG. 6 illustrates an example of a functional block of the signal processor 15. For example, as illustrated in FIG. 6, the signal processor 15 includes an output unit 151, a noise event counter 152, a noise determination unit 153, and a threshold changing unit 154.

A noise determination module including the noise event counter 152 and the noise determination unit 153 determines whether or not each event signal Ed is a signal corresponding to noise on the basis of an event signal Ed output from each pixel 11. For example, in the pixel array section 10, a plurality of pixels 11 is assumed to be two-dimensionally arranged in an effective pixel region where light from the outside enters. At this time, the noise determination module scans, within map data that associates a plurality of event signals Ed with the arrangement of the plurality of pixels 11 in the effective pixel region, an inspection region including at least three or more pixels 11. On the basis of a distribution of event signals Ed included in that inspection region, the noise determination module determines whether or not an event signal Ed of a pixel of interest in the inspection region is a signal corresponding to noise.

FIGS. 7 and 8 illustrate an example of the map data. In FIGS. 7 and 8, "POS" indicates that an event signal Ed is a positive event signal Ed, and "NEG" indicates that an event signal Ed is a negative event signal Ed. In FIG. 7, an inspection region CR is a region including nine pixels 11 (3×3 pixels 11). In FIG. 8, an inspection region CR is a region including three pixels 11 (1×3 pixels 11). In the inspection region CR, a pixel 11 corresponding to the center is a pixel of interest, and pixels adjacent to the pixel of interest are surrounding pixels. The inspection region CR is a region including a pixel of interest and a plurality of surrounding pixels. In FIGS. 7 and 8, an event signal Ed of a circled pixel 11 indicates a signal determined to be noise.

For example, the noise event counter 152 scans an inspection region CR in the above-described map data. At this time, for example, each time the inspection region CR is shifted by one pixel, the noise event counter 152 counts the number of event signals Ed having the same polarity as an event signal Ed of the pixel of interest (a count number Nx) in the inspection region CR. When the count number Nx in each inspection region CR is equal to or less than $\alpha$ ($\alpha \geq 1$), the noise determination unit 153 determines that the event signal Ed of the pixel of interest is noise. When the count number Nx in each inspection region CR is more than $\alpha$ ($\alpha \geq 1$), the noise determination unit 153 determines that the event signal E of the pixel of interest is not noise.

It is to be noted that the noise determination module may perform the noise determination without setting an inspection region CR. For example, in a case where a certain pixel (a pixel of interest) and each of pixels adjacent to the pixel of interest differ in the polarity of an event signal Ed from each other, the noise determination module may determine that the event signal Ed of the pixel of interest is noise.

The noise determination module (the noise determination unit 153) outputs information about an address of a pixel 11 determined to be noise (noise address information) to the output unit 151. The noise determination module (the noise determination unit 153) further outputs reliability determination data Rdd in the above-described map data to the threshold changing unit 154 and the converter 16. The reliability determination data Rdd includes, for example, the number of noise events in the above-described map data, a result of determination of whether or not the number of noise events in the above-described map data is within the acceptable range, a threshold (a threshold setting signal th) to be described later, etc.

The output unit 151 generates event raw data Erd on the basis of event signals Ed output from pixels 11 and the noise address information input from the noise determination module (the noise determination unit 153). For example, the output unit 151 excludes an event signal Ed of a pixel 11 determined to be noise from event raw data Erd' including the event signals Ed output from the pixels 11. Excluding is, for example, to set data of all bits of the event signal Ed of the pixel 11 determined to be noise to "0". By doing this, the output unit 151 generates event raw data Erd from the event raw data Erd', and outputs the generated event raw data Erd to the converter 16.

The threshold changing unit 154 determines whether or not to change the current threshold setting signal th input from the controller 18 on the basis of the reliability determination data Rdd input from the noise determination module (the noise determination unit 153) and a predetermined criterion for determination. In a case where the threshold changing unit 154 has determined that it is necessary to change the threshold setting signal th, using a predetermined method, the threshold changing unit 154 changes the threshold setting signal th, and outputs the threshold setting signal th after the change to the controller 18. The "predetermined criterion for determination" and the "predetermined method" will be described in detail later.

The controller 18 outputs, for example, the current threshold setting signal thp (t) for setting the upper limit threshold voltage Vthp in the quantizer 43 and the current threshold setting signal thn(t) for setting the lower limit threshold voltage Vthn in the quantizer 43 to the threshold changing unit 154. For example, in a case where it has been determined that it is necessary to change the threshold setting signal thp (t), using the predetermined method, the controller 18 changes the threshold setting signal thp (t), and outputs the threshold setting signal thp (t+1) after the change to the controller 18. For example, in a case where it has been determined that it is necessary to change the threshold setting signal thn(t), using the predetermined method, the controller 18 changes the threshold setting signal thn(t), and outputs the threshold setting signal thn(t+1) after the change to the controller 18. For example, in a case where the threshold changing unit 154 has performed a process of changing the thresholds, the controller 18 sets, as the threshold setting signals thp and thn, the threshold setting signals thp (t+1) and thn(t+1) after the change in the quantizer 43. For example, in a case where the threshold changing unit 154 has not performed the process of changing the thresholds, the controller 18 sets, as the threshold setting signals thp and thn, the (original) threshold setting signals thp (t) and thn(t) before the change in the quantizer 43.

For example, as illustrated in FIG. 9, the converter 16 includes an output format converter 16A and an output timing controller 16B. The output format converter 16A converts various data obtained from the signal processor 15 into the format of transfer data in the bus 300. The output format converter 16A converts, for example, event raw data Erd and reliability determination data Rdd into the format of transfer data in the bus 300. The output format converter 16A converts, for example, image data Id including a plurality of pixel signals acquired from the column processor 14 into the format of transfer data in the bus 300. On the basis of a timing control signal from the output timing controller 16B, the output format converter 16A outputs data Da after the conversion to the transmitter 17. The transmitter 17 transmits data Db obtained from the converter 16 to the processor 200 via the bus 300.

FIG. 10 illustrates an example of the data Da output from the converter 16. FIG. 11 illustrates an example of the data Db output from the transmitter 17. The data Da and Db are mipi CSI-2 data or mipi CSI-3 data.

For example, in the data Da and Db to transmit an image for one frame, between frame start (FS) indicating the start of a frame and frame end (FE) indicating the end of the frame, with respect to each line of event raw data Erd, a packet with data of the line stored is generated, or, with respect to each of parts into which the line is divided, a packet with data of the part stored is generated. In the data Da and Db, a packet header (PH) is disposed at the head, and a packet footer (PF) is disposed at the foot. And, a payload with the event raw data Erd stored is disposed between the packet header and the packet footer. In the data Da and Db, a footer region includes footer information including embedded data. The embedded data indicates additional information that is able to be embedded in the header or the footer of the data Da and Db. At this time, the embedded data includes, as reliability determination data Rdd, the number of noise events in the above-described map data, a result of determination of whether or not the number of noise events in the above-described map data is within the acceptable range, etc.

FIG. 12 illustrates an example of the data Da output from the converter 16. FIG. 13 illustrates an example of the data Db output from the transmitter 17. In the data Da and Db, a packet header includes the number of noise events with respect to each line of event raw data Erd.

It is to be noted that in a case where image data including a plurality of pixel signals acquired from the column processor 14 is transmitted to the processor 200 through the converter 16 and the transmitter 17, this image data is stored in a payload.

[Operation]

Subsequently, a threshold changing procedure in the imaging device 100 is described. FIG. 14 illustrates an example of the threshold changing procedure in the imaging device 100.

First, the imaging device 100 starts imaging (step S101). Next, each pixel 11 of the pixel array section 10 generates a photocurrent in response to incident light, and generates, as a pixel signal, an analog signal (an electrical signal) of a voltage according to the generated photocurrent. Furthermore, in a case where an amount of change in the pixel signal exceeds a predetermined threshold, each pixel 11 of the pixel array section 10 generates an event signal. The pixel array section 10 outputs the generated event signal to the signal processor 15. Thus, the signal processor 15 acquires event image data including a plurality of event signals (step S102).

Next, the signal processor 15 (the noise determination module) acquires the number of events Na and the number of noise events Nb included in the event image data (the plurality of event signals acquired from pixels 11) (steps S103 and S104). Next, the signal processor 15 (the noise determination module) determines whether or not the current mode is a noise reduction mode (step S105). As a result, in a case where the current mode is the noise reduction mode (Y in step S105), the signal processor 15 (the noise determination module) changes the threshold on the basis of the number of noise events Nb. Specifically, the signal processor 15 (the noise determination module) determines whether or not the number of noise events Nb is within an acceptable range (step S106). As a result, in a case where the number of noise events Nb is not within the acceptable range (N in step S106), the signal processor 15 (the noise determination module) changes a threshold Vth (a threshold setting signal th) to cause the number of noise events Nb to be close to the acceptable range (step S107), and returns to step S102.

In a case where the number of noise events Nb is within the acceptable range (Y in step S106), or in a case where the current mode is not the noise reduction mode (N in step S105), the signal processor 15 (the threshold changing unit 154) determines whether or not the number of events Na is within an acceptable range (step S108). As a result, in a case where the number of events Na is not within the acceptable range (N in step S108), the signal processor 15 (the threshold changing unit 154) changes the threshold Vth (the threshold setting signal th) to cause the number of events Na to be close to the acceptable range (step S109), and returns to step S102. In a case where the number of events Na is within the acceptable range (Y in step S108), the pixel array section 10 determines whether or not to terminate the imaging. As a result, in a case where a control signal to terminate the imaging has not been input (N in step S110), the pixel array section 10 continues the imaging, and the process returns to step S102. In a case where a control signal to terminate the imaging has been input (Y in step S110), the pixel array section 10 terminates the imaging (step S111).

FIG. 15 illustrates an example of change in the number of noise events Nb with change in the threshold. For example, as illustrated in FIG. 15, the signal processor 15 (the threshold changing unit 154) changes (increases) the threshold Vth (the threshold setting signal th) step-by-step to cause the number of noise events Nb to be close to the acceptable range. Then, the number of noise events Nb gradually becomes closer to the acceptable range. As a result, the event image data changes, for example, from noisy data like one illustrated in FIG. 16(A) to less-noisy data like one illustrated in FIG. 16(B).

Even in a case where the number of noise events Nb is within the acceptable range, the signal processor 15 (the threshold changing unit 154) continues to change (increase) the threshold Vth (the threshold setting signal th) to cause the number of events Na to be close to the acceptable range (the number of expected events Nc). As a result, when the number of events Na has fallen within the acceptable range (has become equal to or less than the number of expected events Nc), the signal processor 15 (the threshold changing unit 154) stops changing the threshold Vth (the threshold setting signal th). That is, using the fixed threshold Vth (the fixed threshold setting signal th), each pixel 11 generates an event signal Ed. At this time, if the number of expected events Nc is too low, the event image data becomes, for example, as illustrated in FIG. 16(A), one reduced in not only noise but also the edges of a subject. Therefore, it is preferable that the number of expected events Nc be set to a value according to an imaging scene.

Subsequently, the processor 200 is described. The processor 200 performs processing using various data obtained from the imaging device 100. The processor 200 acquires, as the various data, for example, event raw data Erd and reliability determination data Rdd, and acquires image data Id. At this time, the processor 200 may include, for example, a reliability determination unit 210 and an interpolation processing unit 220 as illustrated in FIG. 17.

The reliability determination unit 210 determines the reliability of the event raw data Erd on the basis of the reliability determination data Rdd obtained from the imaging device 100. For example, in a case where a result of determination included in the reliability determination data Rdd indicates that the number of noise events Nb is out of the acceptable range, the reliability determination unit 210 determines that the reliability of the event raw data Erd is low. The reliability determination unit 210 does not perform transmission of the event raw data Erd determined to be low in the reliability to the interpolation processing unit 220. Furthermore, for example, in a case where a result of determination included in the reliability determination data Rdd indicates that the number of noise events Nb is within the acceptable range, the reliability determination unit 210 determines that the reliability of the event raw data Erd is high. The reliability determination unit 210 transmits the event raw data Erd determined to be high in the reliability to the interpolation processing unit 220. In a case where the image data Id has been input, the reliability determination unit 210 performs transmission of the input image data Id to the interpolation processing unit 220.

When the event raw data Erd has been input from the reliability determination unit 210, the interpolation processing unit 220 outputs, for example, the input event raw data Erd to the outside at intervals of a period Ta. When the image data Id has been input from the reliability determination unit 210, the interpolation processing unit 220 outputs, for example, the input image data Id to the outside at intervals of a period Tb longer than the period Ta. By doing this, it becomes possible to interpolate the data with a plurality of pieces of event raw data Erd until the next time image data Id is output.

For example, as illustrated in FIG. 17, an in-vehicle sensor processing unit 230 may be provided instead of the interpolation processing unit 220. The in-vehicle sensor processing unit 230 uses event raw data Erd input from the reliability determination unit 210, for example, as sensor information of a vehicle equipped with the information processing system 1000, for various control.

For example, as illustrated in FIG. 18, a facial expression detector 240 may be provided instead of the interpolation processing unit 220. The facial expression detector 240 uses event raw data Erd input from the reliability determination unit 210, for example, as image data for detection of a person's facial expression.

Effect

Subsequenlty, the effect of the imaging device 100 is described.

An existing EVS basically has a fixed threshold for event detection, and therefore is disadvantageous in that the robustness with respect to an imaging scene is low. To cope with such an issue, for example, the inventions according to PTLs 1 and 2 propose to automatically set a threshold for event detection. However, the number of expected events changes depending on an imaging scene; therefore, there is an issue that it is difficult to set the number of expected events for automatically setting the threshold for event detection.

Meanwhile, in the present embodiment, of a plurality of electrical signals generated by a plurality of photoelectric conversion elements PD in response to incident light, a signal whose signal change amount exceeds a predetermined threshold is acquired as an event signal Ed by each pixel 11. Of a plurality of event signals Ed acquired by pixels 11, signals corresponding to noise are counted, and the threshold is changed on the basis of the number of noise events Nb obtained by doing that. Thus, for example, in a case where the sensitivity to an imaging scene is too high, the number of noise events No increases; therefore, it is possible to change the threshold to cause the number of noise events Nb to be small. Furthermore, for example, it is also possible to change the threshold to cause the number of noise events Nb to be close to the acceptable range. Accordingly, it is possible to perform the automatic setting of the threshold for event detection more properly.

In the imaging device according to one aspect of the present disclosure, in a case where an amount of change in an electrical signal generated by a photoelectric conversion element in response to incident light exceeds the predetermined threshold, an event signal Ed is output from each pixel 11. Of a plurality of event signals Ed output from pixels 11, signals corresponding to noise are counted, and the threshold is changed on the basis of the number of noise events Nb obtained by doing that. Thus, for example, in a case where the sensitivity to an imaging scene is too high, the number of noise events Nb increases; therefore, it is possible to change the threshold to cause the number of noise events Nb to be small. Furthermore, for example, it is also possible to change the threshold to cause the number of noise events Nb to be close to the acceptable range. Accordingly, it is possible to perform the automatic setting of the threshold for event detection more properly.

Furthermore, in the present embodiment, the threshold is changed to cause the number of events Na included in event image data (a plurality of event signals acquired from pixels 11) to be close to the acceptable range (the number of expected events Nc). Thus, it is possible to set the number of noise events Nb according to the number of expected events Nc; therefore, it is possible to perform the automatic setting of the threshold for event detection more properly.

Moreover, in the present embodiment, within the above-described map data, an inspection region CR including at least three or more pixels 11 is scanned, and whether or not an event signal Ed of a pixel of interest in the inspection region CR is a signal corresponding to noise is determined on the basis of a distribution of event signals Ed included in the inspection region CR. Thus, it is possible to properly detect the number of noise events Nb regardless of an imaging scene. Consequently, it is possible to perform the automatic setting of the threshold for event detection more properly.

2. Modification Examples

Modification Example A

In the above-described embodiment, the signal processor 15 may automatically set the number of expected events Nc. At this time, the threshold changing procedure in the imaging device 100 may be, for example, as follows.

FIG. 20 illustrates an example of the threshold changing procedure in the imaging device 100 according to a present modification example. First, the imaging device 100 executes the above-described steps S101 to S107. Next, in a case where the number of noise events Nb is within the acceptable range (Y in step S106), or in a case where the current mode is not the noise reduction mode (N in step S105), the signal processor 15 (the threshold changing unit 154) determines whether or not the current mode is a mode (an automatic setting mode) to automatically set the number of expected events Nc (step S112). As a result, in a case where the current mode is the automatic setting mode (Y in step S112), the signal processor 15 (the threshold changing unit 154) automatically sets the number of expected events Nc (step S113). For example, when the number of noise events Nb has fallen within the acceptable range, the signal processor 15 (the threshold changing unit 154) sets the number of events Na at that time as the number of expected events Nc. After the signal processor 15 (the threshold changing unit 154) has completed step S113, or in a case where the current mode is not the automatic setting mode (N in step S112), the signal processor 15 (the threshold changing unit 154) executes steps S108 and onward.

FIG. 21 illustrates an example of change in the number of noise events Nb with change in the threshold. For example, as illustrated in FIG. 21, the signal processor 15 (the threshold changing unit 154) changes (increases) the threshold Vth (the threshold setting signal th) step-by-step to cause the number of noise events Nb to be close to the acceptable range. Then, the number of noise events Nb gradually becomes closer to the acceptable range. Furthermore, when the number of noise events Nb has fallen within the acceptable range, the signal processor 15 (the threshold changing unit 154) sets the number of events Na at that time as the number of expected events Nc. As a result, the number of noise events Nb remains an approximately constant value.

In the present modification example, when the number of events Na included in event image data (a plurality of event signals acquired from the pixels 11) has reached the acceptable range (the number of expected events Nc), the number of events Na at that time is set as the number of expected events Nc. Thus, it is possible to set the number of noise events Nb according to the number of expected events Nc; therefore, it is possible to perform the automatic setting of the threshold for event detection more properly.

Modification Example B

In the above-described embodiment and Modification Example A, the imaging device 100 may include, for example, an illuminometer 19 as illustrated in FIG. 22. The illuminometer 19 is disposed adjacent to the pixel array section 10, and measures illuminance of light that enters an adjacent region of the pixel array section 10. The illuminometer 19 outputs illuminance data Ld obtained by the measurement to the noise determination module. The illuminance obtained by the illuminometer 19 is substantially equal to the illuminance of light that enters the pixel array section 10.

In a present modification example, for example, as illustrated in FIGS. 23 and 24, the noise determination module determines whether or not an event signal Ed of a pixel of interest in an inspection region CR is a signal corresponding to noise on the basis of a criterion derived on the basis of the illuminance data Ld obtained by the illuminometer 19 and a distribution of event signals Ed output from pixels 11. For example, as the above-described criterion, the noise determination module may set the number of expected events Ne according to the illuminance data Ld. In this way, by setting the number of expected events Ne according to the illuminance data Ld, it becomes possible to perform the automatic setting of the threshold for event detection more properly.

In the present modification example, for example, as illustrated in FIG. 25, a header region may include header information including embedded data. At this time, the embedded data includes, as reliability determination data Rdd, the illuminance data Ld. In this way, the illuminance data Ld is transmitted to the processor 200, which allows the processor 200 to execute a process according to the illuminance data Ld.

Modification Example C

In the above-described embodiment and Modification Examples A and B, for example, as illustrated in FIGS. 26 and 27, the pixel array section 10 may include a plurality of light-shielding pixels 11*a* in the periphery (a light-shielding region) of the effective pixel region. Each light-shielding pixel 11*a* includes, for example, a pixel 11 and a light-shielding layer configured to protect the pixel 11 from incidence of light from the outside. FIG. 26 illustrates a case where the plurality of light-shielding pixels 11*a* is disposed in a horizontal light-shielding region adjacent to an effective pixel region. FIG. 27 illustrates a case where the plurality of light-shielding pixels 11*a* is disposed in a vertical light-shielding region adjacent to an effective pixel region.

In a present modification example, a plurality of pixels provided in the pixel array section 10 includes a plurality of pixels 11 provided in the effective pixel region and a plurality of light-shielding pixels 11*a* provided in the light-shielding region. The noise determination module sets, of a plurality of event signals acquired from the pixels 11 provided in the pixel array section 10, a plurality of event signals acquired from the light-shielding pixels 11*a* disposed in the light-shielding region as signals corresponding to noise. That is, the noise determination module sets the number of event signals acquired from the light-shielding pixels 11*a* disposed in the light-shielding region as the number of noise events Nb. Thus, for example, in a case where the sensitivity to an imaging scene is too high, the number of noise events Nb increases; therefore, it is possible to change the threshold to cause the number of noise events Nb to be small. Furthermore, for example, it is also possible to change the threshold to cause the number of noise events Nb to be close to the acceptable range. Accordingly, it is possible to perform the automatic setting of the threshold for event detection more properly.

In the present modification example, for example, as illustrated in FIG. 28, the noise determination unit 153 may derive a horizontal histogram of a plurality of event signals Ed acquired from a plurality of light-shielding pixels 11*a* disposed in a horizontal light-shielding region. At this time, the noise determination unit 153 may set, within the derived histogram, an amount of noise in the same row coordinate as a pixel of interest as a value ($\alpha$) for determining whether or not an event signal Ed of the pixel of interest is a signal corresponding to noise. When a count number Nx in each inspection region CR is equal to or less than $\alpha$, the noise determination unit 153 determines that an event signal Ed of a pixel of interest is noise. When a count number Nx in each inspection region CR is more than $\alpha$, the noise determination unit 153 determines that an event signal E of a pixel of interest is not noise. Even in such a case, it is possible to perform the automatic setting of the threshold for event detection more properly.

In the present modification example, for example, the noise determination unit 153 may derive a vertical histogram of a plurality of event signals Ed acquired from a plurality of light-shielding pixels 11*a* disposed in a vertical light-shielding region. At this time, the noise determination unit 153 may set, within the derived histogram, an amount of noise in the same column coordinate as a pixel of interest as a value (α) for determining whether or not an event signal Ed of the pixel of interest is a signal corresponding to noise. Even in such a case, it is possible to perform the automatic setting of the threshold for event detection more properly.

Modification Example D

In the above-described embodiment and Modification Examples A to C, for example, as illustrated in FIG. 29, the signal processor 15 may include a denoising unit 155 that removes noise included in a plurality of event signals Ed (event image data) acquired from a plurality of pixels 11.

The denoising unit 155 may output event image data obtained by the noise removal to the output unit 151. At this time, the output unit 151 generates event raw data Erd on the basis of the event image data output from the denoising unit 155 and noise address information input from the noise determination module (the noise determination unit 153).

In a present modification example, for example, as illustrated in FIG. 29, the signal processor 15 may further include an event counter 156 that detects the number of events Na included in the event image data output from the denoising unit 155. At this time, the event counter 156 outputs the obtained number of events Na to the noise determination unit 153. The denoising unit 155 further outputs information about an address of a pixel 11 determined to be noise (noise address information) to the noise determination unit 153.

The noise determination unit 153 calculates the number of noise events Nb on the basis of the noise address information output from the denoising unit 155. The noise determination unit 153 calculates α on the basis of the calculated number of noise events Nb. Furthermore, when, of the number of events Na obtained from the event counter 156, the number of events included in an inspection region CR is equal to or less than α, the noise determination unit 153 determines that an event signal Ed of a pixel of interest is noise. When, of the number of events Na obtained from the event counter 156, the number of events included in an inspection region CR is more than α, the noise determination unit 153 determines that an event signal E of a pixel of interest is not noise.

In the present modification example, the noise determination is performed using the denoising unit 155. Even in such a case, it is possible to perform the automatic setting of the threshold for event detection more properly.

Modification Example E

In the above-described embodiment and Modification Examples A to D, the arbiter 13 may be eliminated. Furthermore, in the above-described embodiment and Modification Examples A to D, the noise event counter 152 may calculate illuminance data Ld on the basis of a pixel signal obtained from each pixel 11. Moreover, in the above-described embodiment and Modification Examples A to D, a pixel array section including a plurality of pixels each including the light receiving unit 20 and the pixel signal generator 30 may be provided separately from the pixel array section 10. At this time, the noise event counter 152 may calculate illuminance data Ld on the basis of pixel signals obtained from the pixel array section provided separately from the pixel array section 10.

3. Example of Application to Mobile Body

A technique according to the present disclosure (the present technology) is applicable to various products. For example, the technique according to the present disclosure may be realized as a device mounted on any of kinds of mobile bodies such as a motor vehicle, an electric vehicle, a hybrid electric vehicle, a motorcycle, a bicycle, a personal transporter, an airplane, a drone, a vessel, and a robot.

FIG. 30 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 30, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 30, an audio speaker 12061, a display section 12062, and an instrument panel 12063 are illustrated as the output device. The display section 12062 may, for example, include at least one of an on-board display and a head-up display.

FIG. 31 is a diagram depicting an example of the installation position of the imaging section 12031.

In FIG. 31, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 31 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

As above, there has been described an example of the vehicle control system to which the technique according to the present disclosure may be applied. The technique according to the present disclosure may be applied to, of the above-described components, the imaging section 12031. By applying the technique according to the present disclosure to the imaging section 12031, it becomes possible to obtain highly robust image data. Consequently, it is possible to perform various control using the image data more properly.

The present disclosure has been described above with the embodiment and its modification examples; however, the present disclosure is not limited to the above-described embodiment, etc., and it is possible to make various modifications. It is to be noted that the effects described in the present specification are merely an example. The effects of the present disclosure are not limited to those described in the present specification. The present disclosure may have other effects besides those described in the present specification.

Furthermore, for example, the present disclosure may have the following configuration.

(1)

A signal processing device including:

an acquisition unit that acquires, of a plurality of electrical signals generated by a plurality of photoelectric conversion elements in response to incident light, a signal whose signal change amount exceeds a predetermined threshold as an event signal;

a counter that counts, of a plurality of the event signals acquired by the acquisition unit, signals corresponding to noise; and a threshold changing unit that changes the threshold on the basis of the number of noise events obtained by the counter.

(2)

The signal processing device according to (1), in which the threshold changing unit changes the threshold to cause the number of noise events to be close to an acceptable range.

(3)

The signal processing device according to (2), in which the threshold changing unit changes the threshold to cause the number of events to be close to the number of expected events, the number of events being the number of the event signals acquired by the acquisition unit.

(4)

The signal processing device according to (3), in which when the number of noise events has fallen within the acceptable range, the threshold changing unit sets the number of events at that time as the number of expected events.

(5)

The signal processing device according to any one of (1) to (4), in which the plurality of photoelectric conversion elements is two-dimensionally arranged in an effective pixel region, and the counter further includes scanning, within map data that associates the plurality of event signals with the arrangement of the plurality of photoelectric conversion elements in the effective pixel region, an inspection region including at least three or more pixels, and determining whether or not the event signal of a pixel of interest in the inspection region is a signal corresponding to noise on the basis of a distribution of the event signals included in the inspection region.

(6)

The signal processing device according to (5), in which the counter determines whether or not the event signal of the pixel of interest in the inspection region is a signal corresponding to noise on the basis of the distribution and a criterion derived on the basis of illuminance of the incident light, the electrical signal, or an output signal of a photoelectric conversion element provided separately from the photoelectric conversion element.

(7)

The signal processing device according to any one of (1) to (4), in which the plurality of photoelectric conversion elements includes a plurality of first photoelectric conversion elements provided in an effective pixel region and a plurality of second photoelectric conversion elements provided in a light-shielding region, and the counter sets, as the number of noise events, the number of, of the plurality of electrical signals generated by the plurality of second photoelectric conversion elements, signals whose signal change amount exceeds the threshold.

(8)

An imaging device including:

a plurality of photoelectric conversion elements that photoelectrically converts incident light and generates electrical signals;

a plurality of signal output units provided for the respective photoelectric conversion elements, the plurality of signal output units each outputting an event signal in a case where an amount of change in the electrical signal generated by the corresponding photoelectric conversion element exceeds a predetermined threshold;

a counter that counts, of a plurality of the event signals output from the plurality of signal output units, signals corresponding to noise; and a threshold changing unit that changes the threshold on the basis of the number of noise events obtained by the counter.

(9)

The imaging device according to (8), in which the threshold changing unit changes the threshold to cause the number of noise events to be close to an acceptable range.

(10)

The imaging device according to (9), in which the threshold changing unit changes the threshold to cause the number of events to be close to the number of expected events, the number of events being the number of the event signals acquired by the acquisition unit.

(11)

The imaging device according to (10), in which when the number of noise events has fallen within the acceptable range, the threshold changing unit sets the number of events at that time as the number of expected events.

(12)

The imaging device according to any one of (8) to (11), in which the plurality of photoelectric conversion elements is two-dimensionally arranged in an effective pixel region, and the counter scans, within map data that associates the plurality of event signals with the arrangement of the plurality of photoelectric conversion elements in the effective pixel region, an inspection region including at least three or more pixels, and determines whether or not the event signal of a pixel of interest in the inspection region is a signal corresponding to noise on the basis of a distribution of the event signals included in the inspection region.

(13)

The imaging device according to (12), in which the counter determines whether or not the event signal of the pixel of interest in the inspection region is a signal corresponding to noise on the basis of the distribution and a criterion derived on the basis of illuminance of the incident light, the electrical signal, or an output signal of a photoelectric conversion element provided separately from the photoelectric conversion element.

(14)

The imaging device according to any one of (8) to (11), in which the plurality of photoelectric conversion elements includes a plurality of first photoelectric conversion elements provided in an effective pixel region and a plurality of second photoelectric conversion elements provided in a light-shielding region, the plurality of signal output units includes a plurality of first signal output units corresponding to the plurality of first photoelectric conversion elements and a plurality of second signal output units corresponding to the plurality of second photoelectric conversion elements, and the counter sets the number of the event signals output from the plurality of second signal output units as the number of noise events.

(15)

A signal processing method including:

acquiring, of a plurality of electrical signals generated by a plurality of photoelectric conversion elements in response to incident light, a signal whose signal change amount exceeds a predetermined threshold as an event signal;

counting, of a plurality of the event signals acquired, signals corresponding to noise; and changing the threshold on the basis of the number of noise events obtained.

(16)

The signal processing method according to (15), further including changing the threshold to cause the number of noise events to be close to an acceptable range.

(17)

The signal processing method according to (16), further including changing the threshold to cause the number of events to be close to the number of expected events, the number of events being the number of the event signals acquired by the acquisition unit.

(18)

The signal processing method according to (17), further including when the number of noise events has fallen within the acceptable range, setting the number of events at that time as the number of expected events.

(19)

The signal processing method according to any one of (15) to (18), in which the plurality of photoelectric conversion elements is two-dimensionally arranged in an effective pixel region, and the signal processing method further includes:

scanning, within map data that associates the plurality of event signals with the arrangement of the plurality of photoelectric conversion elements in the effective pixel region, an inspection region including at least three or more pixels; and determining whether or not the event signal of a pixel of interest in the inspection region is a signal corresponding to noise on the basis of a distribution of the event signals included in the inspection region.

(20)

The signal processing method according to (19), in which whether or not the event signal of the pixel of interest in the inspection region is a signal corresponding to noise is determined on the basis of the distribution and a criterion derived on the basis of illuminance of the incident light, the electrical signal, or an output signal of a photoelectric conversion element provided separately from the photoelectric conversion element.

(21)

The signal processing method according to any one of (15) to (18), in which the plurality of photoelectric conversion elements includes a plurality of first photoelectric conversion elements provided in an effective pixel region and a plurality of second photoelectric conversion elements provided in a light-shielding region, and the signal processing method further includes setting, as the number of noise events, the number of, of the plurality of electrical signals generated by the plurality of second photoelectric conversion elements, signals whose signal change amount exceeds the threshold.

The present application claims the benefit of Japanese Priority Patent Application JP2022-054433 filed with the Japan Patent Office on Mar. 29, 2022, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A signal processing device comprising:

a memory storing a program, and at least one processor configured to execute the program to perform operations comprising:

acquiring, of electrical signals generated by a plurality of photoelectric conversion elements in response to incident light, a signal whose signal change amount exceeds a predetermined threshold as an event signal, wherein the plurality of photoelectric conversion elements is two-dimensionally arranged in an effective pixel region;

counting, of a plurality of event signals, signals corresponding to noise;

changing the predetermined threshold on a basis of a number of noise events obtained;

scanning, within map data that associates the plurality of event signals with arrangement of the plurality of photoelectric conversion elements in the effective pixel region, an inspection region including at least three or more pixels; and determining whether or not the event signal of a pixel of interest in the inspection region is a signal corresponding to noise on a basis of a distribution of the plurality of event signals included in the inspection region.

2. The signal processing device according to claim 1, wherein the operations further comprise:

changing the predetermined threshold to cause the number of noise events according to an acceptable range.

3. The signal processing device according to claim 2, wherein the operations further comprise:

changing the predetermined threshold to cause a number of events according to a number of expected events.

4. The signal processing device according to claim 3, wherein the operations further comprise:

when the number of noise events has fallen within the acceptable range, setting the number of events at that time as the number of expected events.

5. The signal processing device according to claim 1, wherein the operations further comprise:

determining whether or not the event signal of the pixel of interest in the inspection region is a signal corresponding to noise on a basis of the distribution and a criterion derived on a basis of illuminance of the incident light, the electrical signals, or an output signal of a photoelectric conversion element provided separately from the photoelectric conversion element.

6. The signal processing device according to claim 1, wherein a plurality of second photoelectric conversion elements are provided in a light-shielding region, and the operations further comprise setting, as the number of noise events, a number of the electrical signals generated by the plurality of second photoelectric conversion elements whose signal change amount exceeds the predetermined threshold.

7. An imaging device comprising the signal processing device according to claim 1.

8. An imaging device comprising:

a plurality of photoelectric conversion elements that photoelectrically converts incident light and generates electrical signals;

a plurality of signal output units respectively provided for the plurality of photoelectric conversion elements, the plurality of signal output units each outputting an event signal in a case where an amount of change in a corresponding electrical signal generated by a corresponding photoelectric conversion element exceeds a predetermined threshold:

a counter that counts, of a plurality of event signals output from the plurality of signal output units, signals corresponding to noise; and a threshold changing unit that changes the predetermined threshold on a basis of a number of noise events obtained by the counter, wherein the plurality of photoelectric conversion elements is two-dimensionally arranged in an effective pixel region, and the counter is configured to scan, within map data that associates the plurality of event signals with arrangement of the plurality of photoelectric conversion elements in the effective pixel region, an inspection region including at least three or more pixels, and determines whether or not the event signal of a pixel of interest in the inspection region is a signal corresponding to noise on a basis of a distribution of the plurality of event signals included in the inspection region.

9. The imaging device according to claim 8, wherein the threshold changing unit changes the predetermined threshold to cause the number of noise events according to an acceptable range.

10. The imaging device according to claim 9, wherein the threshold changing unit changes the predetermined threshold to cause a number of events according to a number of expected events.

11. The imaging device according to claim 10, wherein when the number of noise events has fallen within the acceptable range, the threshold changing unit sets the number of events at that time as the number of expected events.

12. The imaging device according to claim 8, wherein the counter determines whether or not the event signal of the pixel of interest in the inspection region is a signal corresponding to noise on a basis of the distribution and a criterion derived on a basis of illuminance of the incident light, the electrical signals, or an output signal of a photoelectric conversion element provided separately from the photoelectric conversion element.

13. The imaging device according to claim 8, wherein a plurality of second photoelectric conversion elements are provided in a light-shielding region, the plurality of signal output units includes a plurality of first signal output units corresponding to the plurality of photoelectric conversion elements and a plurality of second signal output units corresponding to the plurality of second photoelectric conversion elements, and the counter sets a number of the plurality of event signals output from the plurality of second signal output units as the number of noise events.

14. A signal processing method comprising:

acquiring, of electrical signals generated by a plurality of photoelectric conversion elements in response to incident light, a signal whose signal change amount exceeds a predetermined threshold as an event signal, wherein the plurality of photoelectric conversion elements is two-dimensionally arranged in an effective pixel region;

counting, of a plurality of event signals acquired, signals corresponding to noise;

changing the predetermined threshold on a basis of a number of noise events obtained;

scanning, within map data that associates the plurality of event signals with arrangement of the plurality of photoelectric conversion elements in the effective pixel region, an inspection region including at least three or more pixels; and determining whether or not the event signal of a pixel of interest in the inspection region is a signal corresponding to noise on a basis of a distribution of the plurality of event signals included in the inspection region.

15. The signal processing method according to claim 14, further comprising changing the predetermined threshold to cause the number of noise events according to an acceptable range.

16. The signal processing method according to claim 15, further comprising changing the predetermined threshold to cause a number of events according to a number of expected events.

17. The signal processing method according to claim 16, further comprising when the number of noise events has fallen within the acceptable range, setting the number of events at that time as the number of expected events.

18. The signal processing method according to claim 14, wherein whether or not the event signal of the pixel of interest in the inspection region is a signal corresponding to noise is determined on a basis of the distribution and a criterion derived on a basis of illuminance of the incident light, the electrical signals, or an output signal of a photoelectric conversion element provided separately from the photoelectric conversion element.

19. The signal processing method according to claim 14, wherein a plurality of second photoelectric conversion elements are provided in a light-shielding region, and the signal processing method further comprises setting, as the number of noise events, a number of the electrical signals generated by the plurality of second photoelectric conversion elements whose signal change amount exceeds the predetermined threshold.

* * * * *